United States Patent [19]

Nellen et al.

[11] Patent Number: 4,746,920
[45] Date of Patent: May 24, 1988

[54] METHOD AND APPARATUS FOR CLOCK MANAGEMENT

[75] Inventors: Eric P. Nellen, San Jose; Glenn R. Peterson, Santa Clara, both of Calif.

[73] Assignee: Tandem Computers Incorporated, Cupertino, Calif.

[21] Appl. No.: 845,280

[22] Filed: Mar. 28, 1986

[51] Int. Cl.[4] .......................... H04Q 9/00; H04J 3/06
[52] U.S. Cl. .............................. 340/825.140; 370/103; 375/107; 340/825.21; 368/47
[58] Field of Search .......... 340/825.14, 825.2, 825.21; 375/106, 107, 114; 370/17, 104, 103, 27; 368/46, 47, 55

[56] References Cited

U.S. PATENT DOCUMENTS

| | | | |
|---|---|---|---|
| 3,751,900 | 8/1973 | Philips | 368/47 |
| 4,142,069 | 2/1979 | Stover | 375/107 |
| 4,144,414 | 3/1979 | Nicholas | 375/107 |
| 4,228,496 | 10/1980 | Katzman et al. | 364/200 |
| 4,253,181 | 2/1981 | Watten | 375/107 |
| 4,494,211 | 1/1985 | Schwartz | 375/107 |

Primary Examiner—Donald J. Yusko
Attorney, Agent, or Firm—Townsend and Townsend

[57] ABSTRACT

Disclosed is a method, and apparatus implementing that method, for synchronizing and managing the "system clocks" maintained by each of a number of processor units forming a multiprocessor system. Based on an averaging technique, the method includes creating a synchronization message by an originator processor unit and routing that message to other of the processor units to obtain clock values representative of each of the system clocks of each processor unit. The average clock value is then determined and that average clock value then rerouted to each of the processor units to permit them to update, if necessary, their individual system clocks to the average of all. The method further includes determining the transit times encountered by the various messages so that each processor unit can adjust the average clock value it will use to update or synchronize its system clock to account for such transit times.

10 Claims, 3 Drawing Sheets

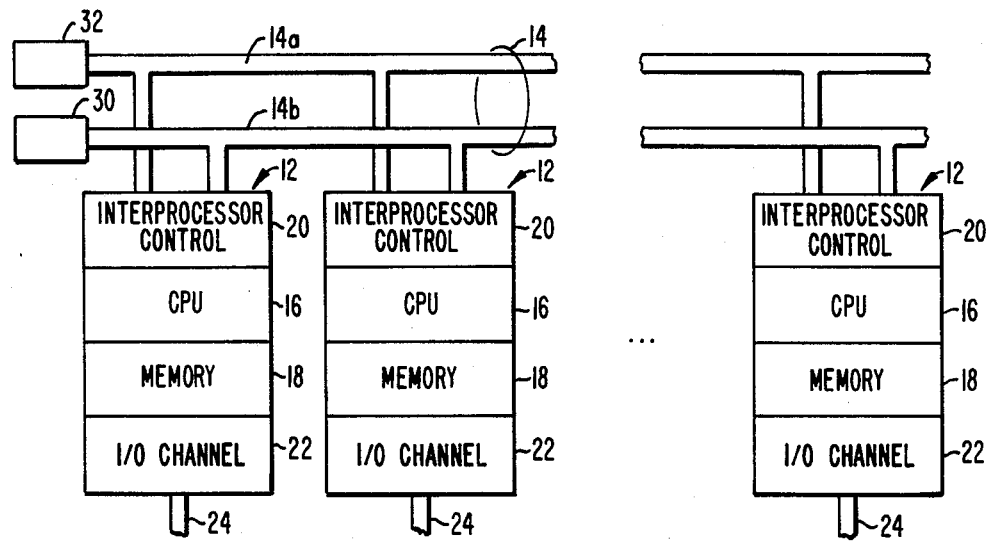
FIG._1.
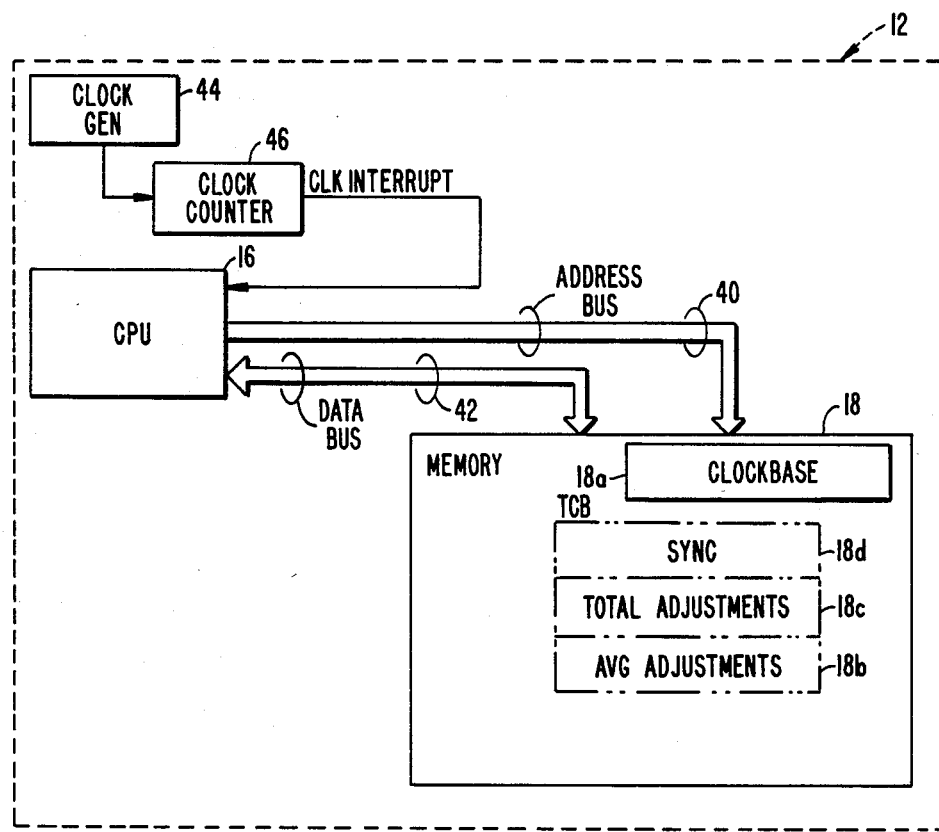
FIG._2.

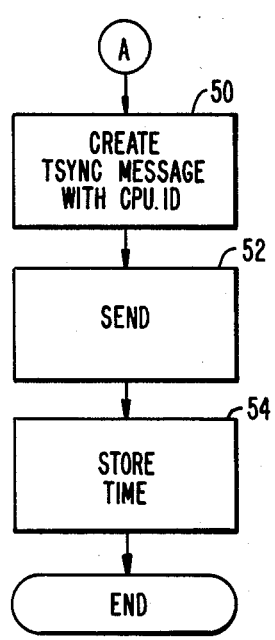
FIG._3.
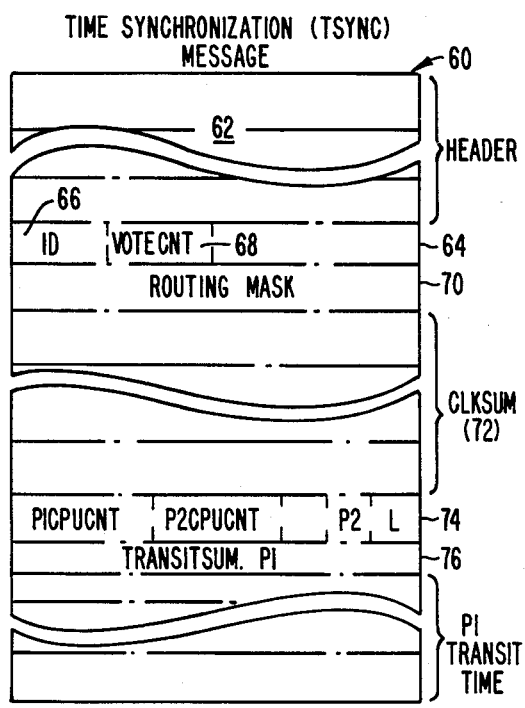
FIG._4.
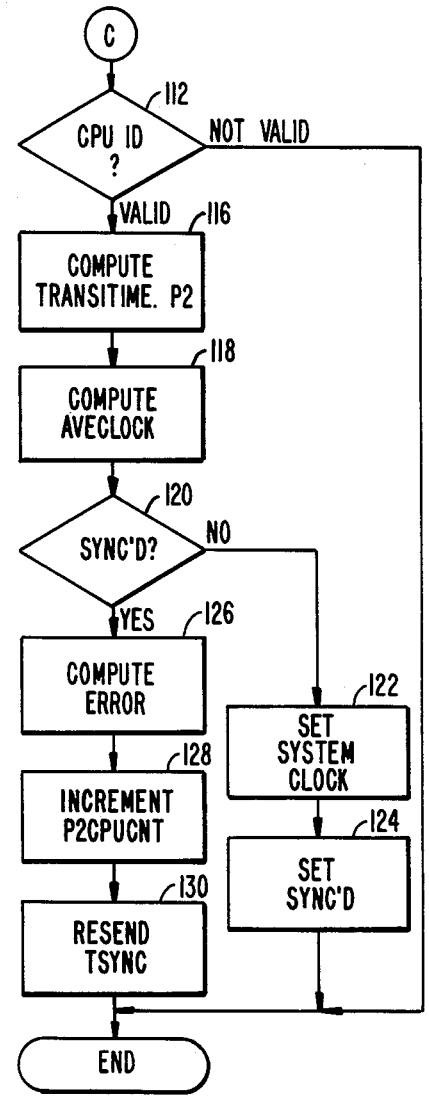
FIG._6.
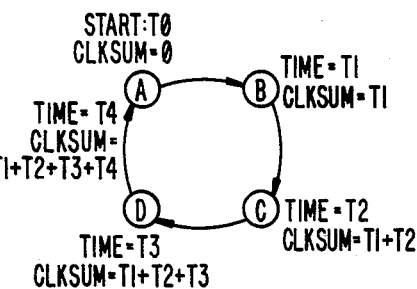
FIG._7.

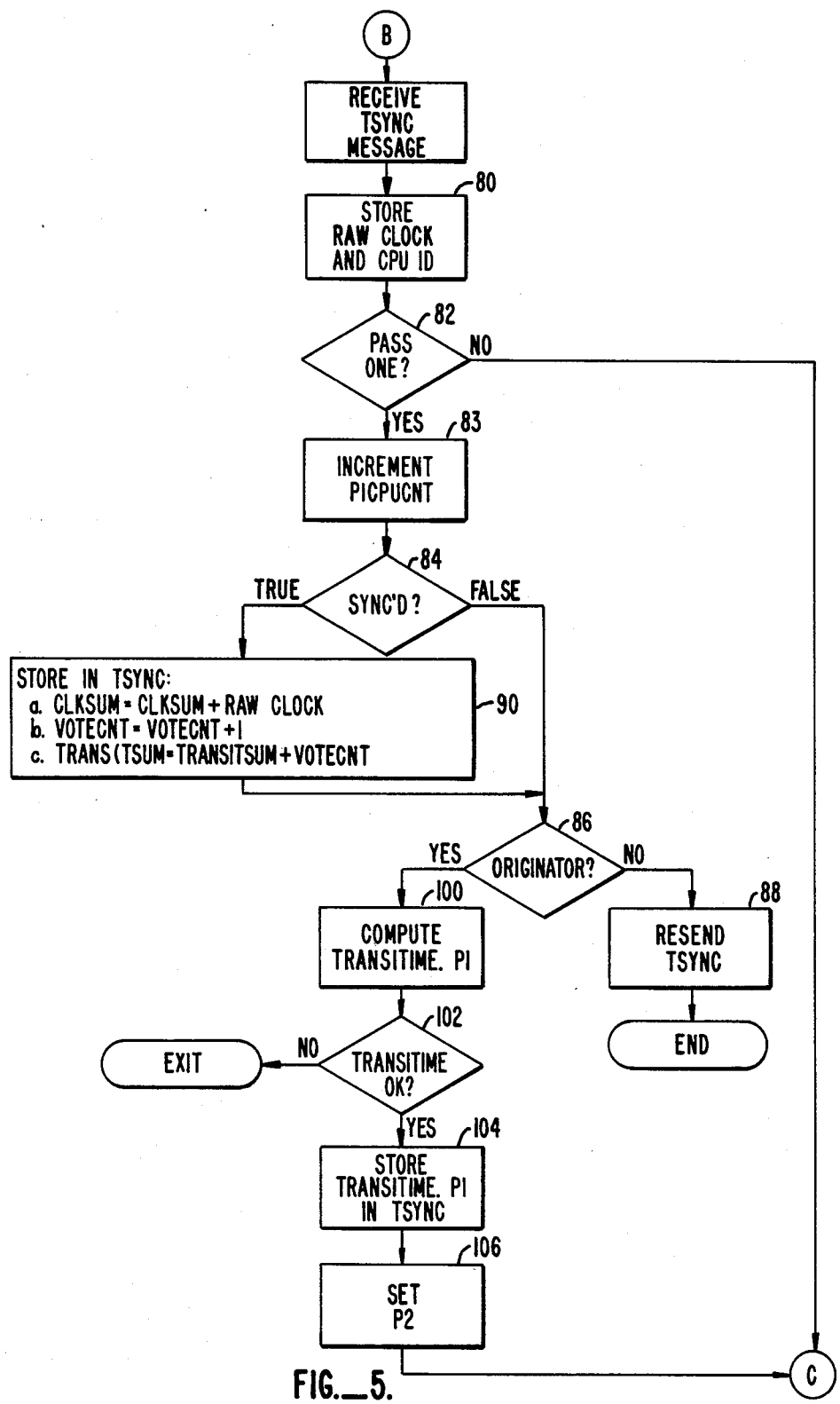
FIG._5.

METHOD AND APPARATUS FOR CLOCK MANAGEMENT

BACKGROUND OF THE INVENTION

The present invention is directed to a multiprocessor system composed of a number of interconnected, individual processor units. More specifically, the present invention provides a method, and teaches apparatus for implementing that method, of maintaining each of the system clocks of each processor unit in synchronization with one another.

Data processing systems often produce data or values that are "time-stamped" when stored; that is, the time (and date) of creation, modification, or storing of the data or value will accompany the data or value for later use. Multiprocessor systems of the type to which the present invention is directed often maintain the fiction of a "system clock," i.e., a single clock accessible to each processor unit of the system, so that any time-stamped actions or values will chronologically correspond to the time-stamped values or actions of other processor units. By providing each of the individual processor units that make up the system with its own clock, and keeping each processor clock synchronized with those of the other processor units, transactions processed by the system, or more particularly the individual processor units, can then be time-stamped (i.e., given a real time indication) by the processor unit, thereby providing an indication of when a particular transaction has been processed relative to other transactions (processed by that or other processor units). For example, multiprocessor systems have been used in the implementation of a number of networked automated teller machines in which large numbers of banking transactions (withdrawals, deposits, etc.) are made in short periods of time. The fictionalized "system clock" is used by each processor unit to provide a notation of the time and date of transaction occurrence.

It will be apparent that in these "transaction processing" environments, it is important that the system clocks of the individual processor units be coordinated or synchronized to one another, sometimes to within milliseconds. For example, the New York Stock Exchange utilizes multiprocessor systems for recording Stock Exchange transactions. It can be critical, therefore, that the transactions be accurately recorded in time in order to preserve transactional priority.

Any synchronization scheme for a multiprocessor system must ensure that the individual processor clocks be monotonically increasing. Were it otherwise, the system clock concept, for accuracy, would not be useful for measuring time between transactions or events, nor would their time stamps be useful as unique identifiers. If a clock jumped backwards, one might obtain the same time stamp more than once.

One previously used technique was to synchronize all clocks to the fastest processor clock in the system. This has the advantage of ensuring that no clock will ever be adjusted backwards. However, the disadvantage of this technique is that, even if crystal-controlled, the individual processor clocks are not perfect; there is a variation among crystals due to manufacturing tolerances. Synchronizing to the fastest processor clock in the system can result in an unacceptable accelerating of system time.

An alternative solution is to maintain, in hardware, a single clock system accessible by each of the multiprocessor units. This, unfortunately, has the disadvantage of instilling a certain amount of vulnerability for fault. If access to the clock is via some form of communication bus used by all processor units, this technique will tend to increase bus traffic, to the exclusion of other necessary interprocessor messaging.

BRIEF DESCRIPTION OF THE INVENTION

An alternative solution is to synchronize all of the individual processor clocks to the average value of those clocks. Because individual crystal frequencies have a normal distribution about the nominal crystal frequency, it can be expected that the average frequency of several crystals to be closer to the nominal value than the frequency of the fastest crystal in any sample. According to the present invention, therefore, there is a presented a method, and apparatus for implementing that method, that synchronizes multiple independent processor clocks by using the medium of transmitting messages over a high-speed interprocessor bus that operate to (1) obtain values of the individual processor clocks from which an average value is determined, and (2) communicating this average value for use in synchronizing the individual processor clocks. The method operates reliably, even though the duration of message transmissions cannot be accurately determined.

Broadly, the invention comprises the following steps: First, a processor unit of a multiprocessor system creates a time synchronization (TSYNC) message that is sequentially routed to the other individual processor units, and returned to the originator processor unit, obtaining values that are indicative of (1) the sum of the processor clocks to be synchronized, and (2) the processor-to-processor routing or transit time of the message. Second, the TSYNC message is then retransmitted by the originator processor unit and sequentially received (and, in turn, retransmitted) by each of the other processor units. Each processor unit extracts the sum and transit values and uses them to calculate an average clock time that is used by the processor unit to resynchronize its processor clock.

In order to preserve the monotonically increasing sequence of each processor clock, resetting of the processor clock for synchronization is performed in stages. Thus, when each processor unit receives the second pass of the TSYNC message, the average clock value is calculated (using the clock sum and the transit values contained in the TSYNC message), and an error value indicative of the difference between the processor clock and the average clock value (at a predetermined time) is obtained. This error value is used in small amounts to incrementally increase or decrease the processor clock over a period of time to bring the clock into synchronization with the calculated average.

BRIEF DESCRIPTION OF THE DRAWINGS

FIG. 1 is a simplified block diagram of a portion of a representative multiprocessor system incorporating the present invention, illustrating a bus system that intercouples multiple ones of the processor unit for transmitting messages therebetween;

FIG. 2 illustrates, in greater detail, the portions of a processor unit that are important to the present invention;

FIGS. 3-6 are flow charts illustrating operation of the invention; and

FIG. 7 is a diagram for use in explaining, by an analogy, the method of the present invention.

DETAILED DESCRIPTION OF THE INVENTION

An Analogy:

Before proceeding to a detailed description of the invention, it will be beneficial to first consider an analogy. Suppose one awoke one day to find the sun shining, but the electric alarm clock (no battery back-up) reading "01:20." It is determined that the electric power had been off during the night, and the need to find out what the correct time is realized. Unfortunately, another clock, a radio, a telephone, or any other source of correct time is not available. There are, however, nearby neighbors. Thus, it is decided to visit the closest neighbor.

It is known that the clock is running correctly, even though the time is not correct. As the trip to the neighbor begins, the clock's time is noted and recorded: It indicates "01:30." Upon arrival at the neighbor's house, one is informed that the neighbor set his or her clock to a radio broadcast a little earlier, and that the clock now reads exactly 6:00 A.M. With this information, the trip home is begun. Upon return home it is noted that the clock now reads "02:00." One can, therefore, correctly deduce that it took exactly one-half hour to walk to the neighbor's and back. Assuming that the trip was made at the same speed in both directions, and that negligible time was spent talking to the neighbor, it is concluded that it took 15 minutes to return from the neighbor's house. Because 15 minutes have elapsed since it was found that the time was 6:00 A.M., one can conclude that it must now be 6:15 A.M. The clock is immediately set to 6:15 A.M. One has now "synchronized" his or her clock to the neighbor's clock.

There are several assumptions that were made in the foregoing analogy. First, it was assumed the "unsynchronized" clock was fairly accurate, even though it might not be set to the correct time. Second, a constant speed was traveled between one's own house and the neighbor's. Third, clocks can be read instantaneously. And, finally, except for the transit time, all other activities were virtually instantaneous.

Analogy with Three Neighbors:

Let us now extend the foregoing analogy to assume that there are three neighbors with clocks, and that we want to compute the average of their clocks. The diagram set forth in FIG. 7 will facilitate this analogy.

The trip is started from (A), reading first the clock and saving the value as the starting time ($T\phi$). We travel to the first neighbor, (B), and read the time of arrival (T1), which value will begin a running total called CLKSUM. We then continue to the next neighbor, (C), and add the clock time we read there (T2) to CLKSUM. In similar fashion, we travel to the next neighbor (D), read the clock time (T3) and add it to our running total CLKSUM, and return home (A), read the clock (T4), add it to the running total CLKSUM, and save it as the ending time.

At this point, we can compute the elapsed time for the roundtrip. It is simply the difference between the ending time, T4, and the starting time, $T\phi$. We can also compute the average transit time, TA, which is equal to the elapsed time divided by the number of transits (4), $(T4-T\phi)/4$.

The running total (CLKSUM), similar to the earlier analogy, must be adjusted to account for the time in transit from A to neighbors B, C, D and return. Thus, for example, one average transit time must be added to the value of the clock obtained at D, T3, to compensate for the time in transit from D to A (and to bring the clock time read at D up to date with that read at A); adding TA will achieve this compensation. In similar fashion, the value of the clock obtained at C must be adjusted to compensate for the transit time from C to A, since two average transit times (2TA) have elapsed since the clock time read at C, i.e., T2. Adding 2TA, therefore, will achieve the desired adjustment of C's clock value. And, of course, following this reasoning, we must add three average transit times (3TA) to the clock value obtained at B. Adding 6TA to the running total (CLKSUM) of all clock values completes the compensation for all clock values.

The current instantaneous average of the clocks at B, C, D and A is:

$$(CLKSUM+6TA)/4.$$

As perhaps evident in the foregoing analogies, there are a number of considerations that must be kept in mind when synchronizing a number of processor clocks according to the present invention. First, as will be seen, it may be that certain of the processors are initially not in synchronization. Accordingly, using the values of their processor clock will throw off the average. Thus, as will be seen, the method of the present invention accumulates only the processor clock values of processor clocks that are synchronized.

Another consideration: Since each processor clock value is taken at a different time, each includes a different number of average transit times, depending upon where in the chain of transmission the processor clock value was obtained. The sum must be adjusted for these transit time accumulations.

Overview of the Apparatus Implementing the Invention:

Referring now to FIG. 1, there is illustrated in simplified block diagram a multiprocessor system, designated generally with the reference numeral 10. As shown, the multiprocessor system 10 includes a plurality of processor units 12 interconnected by an interprocessor bus (IPB) system 14. Each of the processor units 12 broadly includes a central processing unit (CPU) 16, an associated memory unit 18, and an interprocessor control unit 20 that connects the CPU to the IPB system 14 for communicating messages to and from other of the processor units 12. The processor unit 12 also includes an input/output (I/O) channel 22 that connects the individual processor units 12 to an input/output (I/O) bus 24 that, in turn, couples each processor unit to peripheral units (not shown) such as tape units, disc drives, terminals, and the like.

Interprocessor communications are conducted on the IPB system 14 using one or the other of the IPB buses 14a or 14b. Communications on the IPB system 14 are conducted under the general supervisory control of bus controllers 30 and 32, in combination with operation of the interprocessor control 20 of each processor unit 12. The structure and operation, including interprocessor messaging, is described more fully in U.S. Pat. No. 4,228,496, for MULTIPROCESSOR SYSTEM, which patent is hereby incorporated by reference.

Referring now to FIG. 2, there is illustrated, in somewhat greater detail, those parts of each processor 12 that are instrumental in carrying out the present invention. More specifically, as FIG. 2 illustrates, the CPU 16 and memory 18 are interconnected by an address bus 40 that carries addresses generated by the CPU 16 to access selected memory locations of the memory 18 for reading and/or writing data that is carried on the data bus 42. Also included in each processor 12 is a clock signal generator 44. Typically crystal-controlled, the clock generation 44 produces a number of clock signals, including a 1-MHz clock signal that is communicated to a clock counter 46. Clock counter 46 is configured to count the one microsecond increments, from zero to 10,000, of the 1-MHz clock signal. When the clock counter 46 reaches the count of 10,000 (representing 10 milliseconds), the next clock signal pulse causes it to reset to zero, and also generates an interrupt (CLKINTERRUPT) signal to the CPU 16. This causes the CPU 16 to increment a memory location 18a containing a value identified as CLKBASE. CLKBASE is a 64-bit word that forms, together with the clock counter 46, the processor clock for the processor unit 12. At any moment in time, the processor clock value for the processor unit 12 will be the sum of CLKBASE and the content of the clock counter 46. Any further reference to the processor clock value of a processor unit 12 shall be taken to mean this sum, unless otherwise explained. CLKBASE is normally initialized by the operating system to a value which represents the local civil time (i.e, wall clock time) in microseconds since midnight, Dec. 31, 1974.

CLKBASE is stored at a memory location 18a (FIG. 2) in the memory 18. Contained in another area of the memory 18, generally referred to as the time control block (TCB), is other state information related to time management of the system clock. For example, included in the TCB, at a memory location 18b, is an average adjustments value (AVGADJUSTMENTS) that is indicative of all adjustments made to CLKBASE by the method described herein. At memory location 18c of the TCB is a total adjustments (TOTALADJUSTMENTS) value that is indicative of all adjustments made to CLKBASE to ensure that it represents local civil time. This value, therefore, includes that adjustment made to set CLKBASE to represent time since Dec. 31, 1974, the AVGADJUSTMENTS value, and any value necessary to fix CLKBASE for daylight saving time adjustment. A "RAW CLOCK" value can be obtained by subtracting TOTALADJUSTMENTS from the sum of the CLKBASE value and the content of the clock counter 46. RAW CLOCK represents the amount of time, in microseconds, since the first processor unit 12 was powered on. During initial power-on sequencing, one of the processor units 12 comes up (begins operating) before the other processor units 12. The first processor unit 12 transfers some of its operating parameters, including RAW CLOCK, to the other processor units 12 as they come on-line.

Finally, at memory location 18d of the TCB, there is kept a flag value identified as SYNC. This is a Boolean attribute, identifying (depending upon its state: TRUE or FALSE) to the processor unit 12 whether or not its processor clock is in time synchronization with the processor clocks of the other processor units 12 of the multiprocessor system 10 (FIG. 1).

Time Synchronization: An Overview

Generally, there are two aspects to clock synchronization which the present invention addresses: First, the invention functions to maintain the synchronization of those processor clocks previously synchronized; second, the invention is used to allow an individual processor unit 12 which, for one reason or another, has just come on-line the needs to set its processor clock, to synchronize itself.

The first aspect of the invention involves two phases: In the first phase, a time synchronization (TSYNC) message is created by a designated one of the processor units 12 (called a "locker" processor) and sequentially circulated among all of the processor units 12, via the IPB system 14, to obtain a value from which can be obtained the average of all the processor clocks. The processor unit 12 designated as the locker processor then retransmits the TSYNC message along the same circuitous route of processor units 12 of the system 10. This time, however, each processor unit 12 uses values contained in the TSYNC message to determine the error between its processor clock and the average of all processor clocks. This error is subsequently used to adjust the CLKBASE value for that processor unit 12.

In the second aspect of the invention, an "originator" processor unit 12 sends a substantially identical TSYNC message along a substantially identical route of processor units 12 to collect an accumulated clock value from which an average of all processor clocks can be obtained. However, in this second aspect, the TSYNC message is not retransmitted, but is used by the originator processor unit to set its processor clock.

Details of the Invention:

Referring now to FIG. 3, there is illustrated in flowchart form the steps taken by either a "locker" or a "non-locker" processor unit, the latter being a processor unit desiring to set or otherwise synchronize its processor clock. As FIG. 3 shows at step 50, the method begins with the creation of a TSYNC message that, at step 52, is sent to the other processor units 12 of the multiprocessor system 10, according to a prescribed routing list, which will be discussed more fully below. The time the message is sent is stored in memory 18 of the originating (locker or non-locker) processor unit 12 at step 54.

Referring now to FIG. 4, there is illustrated a diagram of the TSYNC message, designated with the reference numeral 60. The TSYNC message, be it created and sent by a processor unit 12 that is functioning as a locker processor, or by a processor unit 12 merely seeking to set its processor clock, is a 16-word packet (each word being two bytes in length). As FIG. 4 illustrates, the TSYNC message 60 generally includes a five-word header 62 that contains information used by the operating system for the transmission of such (and other) messages from one processor unit 12 to another. The five words of header information 62 is followed by a word 64 containing two fields, an identification (ID) field 66 and a vote count (VOTECNT) field 68. The ID field 66 contains the identification (ID) of the processor unit that created the particular TSYNC message 60. THE VOTECNT field 68 contains a count of those processor units that have contributed their processor clocks to the synchronization process.

Continuing, the seventh word 70 of the TSYNC message is a routing mask, containing information concerning the sequence of processor units 12 that the TSYNC message 60 will be circulated among. In the present system, there can be up to 16 individual processor units 12. Each of the processor units 12 is identified by a bit position of the routing mask word 70. If the bit position is TRUE, the processor is present; if the bit position is FALSE, the processor unit is, in effect, nonexistent.

Conceptually, for purposes of the discussion of this invention, the topology of the processor unit 12 and the interprocessor bus 14 may be thought of as ring-like, with each processor unit 12 connected to two neighbor processor units 12. Thus, we can talk about the "next processor unit on the right" to mean the next highest-numbered processor unit 12, except in the case of the highest-numbered processor unit in the system, where the next processor unit on the right is the lowest-numbered processor unit in the system. The routing mask word 70 maintains this concept, where each processor unit in this "hierarchy" is identified by a predetermined bit position of the routing mask word 70. Each processor unit 12 contains a data structure, in memory 18 (FIG. 2), from which the routing mask 70 can be formed.

Following the routing mask word 70 is a group of four words 72 which provide space for a sum (CLKSUM) of all processor clocks (that are in synchronization) of the system 10. As the TSYNC word 60 is sequentially circulated among the processor units 12, each adds its processor clock value at the time of receipt to the CLCKSUM value and retransmits the message 60.

The four-word CLKSUM field 72 is followed in the TSYNC message 60 by message word 74, containing four fields: A first field (P1CPUCNT) contains information identifying the number of processor units 12 that have actually seen the TSYNC message during its first routing; a second field (P2CPUCNT) contains information identifying the number of processor units 12 that have seen the message at any point in time during its second passage among the processor units 12; a third field (P2) identifies whether the TSYNC message is in its first or second pass; and, finally, a fourth, one-bit field (L) identifies whether the TSYNC message 60 was initiated by a locker processor unit, or a non-locker processor unit (one desiring to set its processor clock).

Following the four field message word 74 is a message word containing a value identified in FIG. 4 as TRANSITSUM.P1. This value, as will be seen, is indicative of the amount of individual processor-to-processor transits, and is used in the computation that adjusts the CLKSUM value to account for the time elapsed in the first pass transit of the TSYNC message.

The TSYNC message 60 terminates in another four-word group that contains a value indicative of the average processor-unit-to-processor-unit transit time during a first pass of the TSYNC message 60.

Receipt of the Time Synchronization Message: First Pass

FIG. 5 diagrams the steps taken by each processor unit 12 when a TSYNC message is received. As the flow chart of FIG. 5 indicates, the first activity performed by the receiving processor unit 12 is to store, in the TCB, (FIG. 2) the time of receipt (using RAW CLOCK) of the TSYNC message, together with the identification (ID—from message word 64) of the creator of the TSYNC message being received. At 82, the receiving processor unit 12 determines whether the just-received TSYNC message is on its first pass or second pass by checking the P2 field of the TSYNC message word 74. If FALSE, indicating the message is in its first pass, activity presses to step 83. If, however, the P2 flag is TRUE, activity is transferred to routine C, illustrated in FIG. 6, which will be discussed below.

The processor unit 12 next checks, at 83, memory location 18d of the TCB to determine if its processor clock has previously been set and is in synchronization with the clock of at least one other processor unit 12 of the multiprocessor system 10. The reason for this step, as indicated earlier, is to ensure that the method is not degraded by creating large variances by incorporating processor clocks that are not in synchronization. For example, the system is structured for fault-tolerant operation, allowing processor units to be removed and replaced almost at will. When they are replaced, the system clock of that processor is indeterminate until set, and could significantly affect any averaging method if incorporated. Accordingly, until set, each processor unit contains in its TCB area of memory 18 the SYNC flag at memory location 18d which, when the system clock of the processor unit is set and synchronized, is set to a TRUE.

If, however, the SYNC flag is FALSE, indicating that the system clock of the processor is yet to be synchronized, the processor unit 12 will proceed to step 86 to determine if the TSYNC message was originated by this processor unit 12 by checking the ID again. If not, processor unit 12, at step 88, with resend the TSYNC message to the next processor unit 12 on its right.

If, on the other hand, the test at step 84 is TRUE, indicating the processor unit 12 is in synchronization (and, therefore, eligible to contribute to the synchronization process), the processor unit will proceed from step 84 to step 90, and perform the following steps:

a. First, it will add the value of its processor clock (more accurately, RAW CLOCK) to the CLKSUM field 72 (FIG. 4) of the TSYNC message;
b. The VOTECNT field 68 (message word 64) will be incremented to indicate that the processor unit 12 has contributed to the synchronization method; and
c. The processor unit 12 will add the value of VOTECNT to the value contained in the TRANSITSUM field, creating or maintaining a value that indicates how many processor-to-processor transits are incorporated in the CLKSUM value.

The processor unit 12 proceeds to step 86 to check the ID field 66 of the TSYNC message 60. If the ID value matches that of the processor, indicating that the message originated from that processor unit, the path to step 100 is taken. On the other hand, if the ID value does not match that of the processor unit 12, it will then proceed to step 88, where the TSYNC message is sent to the processor unit 12 "on its right" according to the routing mask 70, and return to other activity.

To pause and review briefly, the method of the invention so far described, synchronization of the processor clocks proceeds, initially, substantially as follows: A processor unit 12 (locker or non-locker) creates and sends a TSYNC message 60 (FIG. 3) that includes a routing mask (word 70) specifying the order of circulation of the TSYNC message by the other processor units 12 of the multiprocessor system 10 (FIG. 1). In turn, each of the other processor units 12 will receive the TSYNC message and, depending upon whether or not its own system clock is in synchronization, will add its system clock to the CLKSUM value carried by the TSYNC message 60, update various "counters" (fields of the TSYNC message 60) to indicate that (1) it had seen the message and (2) it "voted" (i.e., added its system clock to CLKSUM), and then send the message to the next processor unit in line.

Ultimately, the TSYNC message 60 will travel its full route, being passed by each processor unit 12 to the next, returning to the processor unit 12 that created it.

The processor unit 12 that originated the TSYNC message, regardless of whether it is the locker processor (i.e., one given responsibility of periodically creating and sending TSYNC messages to maintain the synchronization of all processor clocks of the system 10) or a non-locker processor unit (one that created and sent the TSYNC message in order to synchronize its processor clock) proceeds initially in the same manner as other processor units 12 did, i.e., executing the steps 80, 82, 84 and 90 described above. And, reaching step 86, the processor unit 12 discovers from an evaluation of the ID that it was the one that created the TSYNC message.

Proceeding to step 100, the processor unit 12 computes an average processor-to-processor transit time (AVGTRANSITIME.P1) for the first pass. This value is computed by subtracting the time value stored in step 54 (FIG. 3) from the time value stored in step 80 (FIG. 5), giving the elapsed time for pass one, and dividing the result by the number of processor units 12 that had *seen* the message, which number is indicated by the value of P1CPUCNT of the TSYNC message 60.

If there is heavy bus traffic, the TSYNC message could be delayed. If it is delayed, it may not be useable; the invention relies upon relatively equal first pass transit times. In order to determine whether or not an unacceptable delay has been encountered between the time the TSYNC message was sent and ultimately received by the originator processor unit 12, a minimum first pass average transit time is maintained in the TCB of memory 18. For locker processor units, the computed first pass average transit time, TRANSITIME.P1, is compared at step 102 to a minimum observed transit time, and if found to exceed the minimum time by more than 100 microseconds the TSYNC message is not allowed to proceed into the second pass. If the originator processor unit was one that needed to set its system clock, and the message unacceptably delayed, a new TSYNC message 60 is created and sent.

For non-locker (unsynchronized) processor units, there is no maintained minimum average transit time. There is, in its place, however, an initial pre-determined minimum used for synchronization purposes (installed during an initial boot of the processor unit). It is this value that the computed TRANSITIME.P1 is compared, as described. If the comparison is unfavorable, the method ends.

If the comparison at step 102 is deemed acceptable, however, for either a locker or non-locker processor unit, TRANSITSUM.P1 is stored in the TSYNC message (at message word 76) by step 104, the pass two (P2) flag is set (step 106), and the method proceeds to routine C (FIG. 6).

Time Synchronization, Initiation of Pass Two:

Routine C is entered from step 82 (FIG. 5) when the TSYNC message is received by a processor unit and found to be in a second pass. This situation is discussed further below in the section designated "Second Pass Processing."

Routine C is also entered at the completion of the first pass circulation of the TSYNC message from step 106. Step 106, however, has transformed the TSYNC message from a first pass message to a second pass message by setting the P2 flag in message word 74. Thus, in effect, regardless of how routine C is entered, its purpose is to process pass two TSYNC messages. The first processor unit 12 to process the now pass-two TSYNC message is the locker.

Second Pass Processing:

Routine C begins by comparing the ID value of the TSYNC message to that of the processor unit 12. If they do not match, the message is discarded, and operation ends. If, on the other hand, the check is VALID, TRANSITIME.P2 is computed in a manner described below. Next, using CLKSUM, an average clock time is computed at step 118 (also described further below). Assume, for the moment, that the TSYNC message was created by a processor unit 12 desiring to synchronize its processor clock, i.e., a non-locker processor unit, and that this processor unit 12 has now received back the TSYNC message it created. At step 120, the processor unit 12 finds (under the assumption here) that it is not in synchronization (i.e., it is a non-locker processor unit that created the TSYNC message), and, therefore, proceeds to step 122 where it sets its processor clock using the computed average clock time. The processor unit 12, at step 124, sets the SYNC flag at memory location 18d (FIG. 2) and ends the synchronization operation.

If, on the other hand, step 120 determines that the TSYNC message is one created by a locker processor unit 12, processing proceeds from step 120 to 126 for second-pass processing.

The TSYNC message 60, during its second pass circulation, carries to each of the processor units 12 the *sum* of the synchronized system clocks of the processor units 12, as opposed to a calculated average. When received by a processor unit 12, it processes the second pass of the TSYNC message 60 initially in the same manner as it did the first pass message—illustrated in FIG. 5. The TSYNC message is received and processed according to step 80; that is, the time the second pass TSYNC message is received is stored in memory 18 by the processor unit 12, together with the ID value. The P2 value is checked at step 82 to determine which pass this TSYNC message is traveling. This time, however, the P2 field will be found to be TRUE, indicating the message is on its second pass. Therefore, rather than continuing to step 84, processing branches to that portion of the sequence of steps illustrated as routine C in FIG. 6.

At step 112 (FIG. 6) the ID value is checked and compared with the ID value stored in step 80 (FIG. 2) to ensure that this is the proper TSYNC message. If the values do not match, the TSYNC message is not valid, and the processor unit 12 discards the message; it is not retransmitted. If, on the other hand, the ID fields match, the TSYNC message received is considered a valid second pass message. The processor unit 12 proceeds to step 116, and computes the pass-two average transit time, that is, the average processor-unit-to-processor-unit transit time in the second pass. This value is obtained by the processor unit 12 by proceeding as follows:

a. First, the total time that elapsed since the processor unit 12 first saw the TSYNC message (in its first pass) is computed by subtracting the RAW CLOCK value saved in the TCB at step 80 (FIG. 5) during first-pass processing from the RAW CLOCK value stored at step 80 during receipt of the second pass of the message.

b. The processor unit 12 then determines how many processor-to-processor transits there were between it and the locker processor unit 12 from the routing mask, and multiplies this number by the TRANSITSUM.P1 value contained in word 76 of the TSYNC message. This value represents the time the TSYNC message took to end its first pass travels and return to the processor unit 12.

c. The processor unit 12 then computes the time the TSYNC message has been in transit during this second pass by subtracting the first pass transit time (computed above in "b") from the total elapsed time found in "a" above. This is TRANSITIME.P2.

Next, at step 118, the instantaneous average of all synchronized processor clocks (AVGCLOCK) is computed by the processor unit 12. At this time, it may be advantageous to look more closely at the CLKSUM value contained in the second pass of the TSYNC message. As indicated above, CLKSUM is the sum of the values of each processor clock of each processor unit 12 *plus* the time the TSYNC message was in transit to any particular processor unit 12. For example, if a particular processor unit was fourth in line as determined by the routing mask word 70 (i.e., there are three processors between it and the processor unit that created and sent the TSYNC message), the processor clock value that is added to CLKSUM by that (fourth in line) processing unit (during first pass processing of the TSYNC message) incorporates four processor-to-processor transit times. In similar fashion, the next processor unit 12 that adds its processor clock value to CLKSUM, will again add the same four transit times, plus the additional transit time. It can be seen, therefore, that the particular way CLKSUM is derived includes a number of transit times that are somewhat like a triangular summation. The total number of transits that are represented in CLKSUM are found in the TRANSITSUM.P1.

With the foregoing in mind, each processor unit 12 that receives the second pass TSYNC message (and is eligible to do so) computes the instantaneous updated average of all synchronized processor clocks of processor units 12 in the following manner:

a. The amount CLKSUM must be adjusted to account for time in transit (first pass). A value, $T_{ADJ}$, is computed by multiplying the pass one TRANSITIME value by the number of pass one transits, i.e., TRANSITSUM.P1.

b. This value $T_{ADJ}$, is added to the CLKSUM value, and the result divided by the number of processor units 12 that contributed to CLKSUM by adding the value of their processor clocks thereto, i.e., VOTECNT.

c. Finally, to account for second pass transit time, the second pass transit time computed above is added to the previously computed average to obtain the instantaneous average for the processor 12 then possessing the TSYNC message.

Next, at step 120, the "sync'd?" check is made. If the processor unit 12 is not in synchronization, the branch to step 122, described above, is taken. If it is synchronized, step 126 is entered and the difference between the processor unit 12 system clock and the computed instantaneous average is determined and stored in the processor's memory 18 is an "error" value. This error value is used to synchronize the system clock of the processor unit 12 in the following manner: TSYNC messages are created and sent by the locker processor unit approximately every ten seconds. Accordingly, during the time that any processor unit 12 receives sequential second pass messages, it will increment or decrement its CLKBASE value at 0.3 second intervals during this approximate ten-second period. Any 0.3 second change will not exceed 50 microseconds. This is the maximum amount CLKBASE can be changed transparently to the system because the time spent adjusting CLKBASE exceeds 50 microseconds. In this manner, the processor clock appears monotonically increasing.

Finally, at step 130, the TSYNC message is sent to the processor unit at the right.

Attached hereto, and identified as Appendix I, is the source code listing for the method of the above-described invention.

APPENDIX I $DATA.GDEVMANG.STIME [32]          T9050 GUARDIAN 90  Time Control - TIMESYNCMSG

```
5001.  000000  0  0   !
5002.  000000  0  0   ! Process a TIME SYNChronization Packet                                                    B00,Grandfather #23
5003.  000000  0  0   !                                                                                          B00,Grandfather #23
5004.  000000  0  0   ! Called by BUSRECEIVE on receipt of a TIMESYNC packet.                                    B00,Grandfather #23
5005.  000000  0  0                                                                                              B00,Grandfather #23
5006.  000000  0  0   PROC!prv! TIMESYNCMSG( PIOP ) RESIDENT, PRIV;                                              B00,Grandfather #23
5007.  000000  1  0   INT .PIOP ( PIO^TEMPLATE );                                                                !B00,Grandfather #23
5008.  000000  1  0                                                                                              !B00,Grandfather #23
5009.  000000  1  0   BEGIN                                                                                      !B00,Grandfather #23
5010.  000000  1  1                                                                                              !B00,EPN#39
5011.  000000  1  1   LITERAL   DAMPING^FACTOR     = 16,   ! Max value of xxxx^DAMP^MUL tables                   B00,EPN#39
5012.  000000  1  1             VOTING^DAMPIDX     =  2,   ! DAMPIDX threshold for voting                        B00,EPN#39
5013.  000000  1  1             TRANTIMEDEVIATION  = 100,  ! usecs above normal trantime allowable               B00,EPN#39
5014.  000000  1  1             MAXCOR             = 50,   ! Maximum correction (usec), each interval            B00,EPN#39
5015.  000000  1  1             CORINT             = 30,   ! Correction intervals per TIMESYNC period            B00,EPN#39
5015.1 000000  1  1   LITERAL   RATELIMIT          =                                                             !B30,EPN#47
5015.2 000000  1  1           MAXCOR * CORINT * 4;         ! Maximum allowable clock rate error                  B30,EPN#47
5016.  000000  1  1                                                                                              !B00,EPN#39
5017.  000000  1  1   INT       IMSENDER;                                                                        !B00,EPN#39
5018.  000000  1  1   INT       TIMESYNCD;                                                                       !B00,EPN#39
5019.  000000  1  1   INT       ORGCPU;                                                                          !B00,EPN#39
5020.  000000  1  1   INT       SENDON      := -2;                                                               !B00,EPN#39
5021.  000000  1  1   INT       NEXTCPU     := -1;                                                               !B00,EPN#39
5022.  000000  1  1   DEFINE    PASS1 = (NOT PASS2) #;                                                           !B00,EPN#39
5023.  000000  1  1   INT       PASS2;                                                                           !B00,EPN#39
5024.  000000  1  1   INT       FROMLOCKER;                                                                      !B00,EPN#39
5025.  000000  1  1   INT       CPUNUM;                                                                          !B00,EPN#39
5026.  000000  1  1   INT       N;                                                                               !B00,EPN#39
5027.  000000  1  1   INT       CPUVOTES;                                                                        !B00,EPN#39
5028.  000000  1  1                                                                                              !B00,EPN#39
5029.  000000  1  1   STRING    PERM^DAMP^MUL[0:15] = 'P' := [16,15,14,13,12,11,10,09,                           !B00,EPN#39
5030.  000010  1  1                                          08,08,08,08,08,08,08,08];                           !B00,EPN#39
5031.  000010  1  1   STRING    TEMP^DAMP^MUL[0:15] = 'P' := [16,15,14,13,12,11,10,09,                           !B00,EPN#39
5032.  000020  1  1                                          08,08,08,08,08,08,08,08];                           !B00,EPN#39
5033.  000020  1  1   STRING    NEXT^DAMP^IDX[0:15] = 'P' := [01,02,03,04,05,06,07,08,                           !B00,EPN#39
5034.  000030  1  1                                          09,10,11,12,13,14,15,15];                           !B00,EPN#39
5035.  000030  1  1                                                                                              !B00,EPN#39
5036.  000030  1  1   FIXED .SG CLOCKBASE := CLOCK^SGADDR;                                                       !B00,EPN#39
5037.  000030  1  1   INT .SG TCB( TCB^TEMPLATE ) := SGO[ TIMEINFO^SGADDR ];                                     !B00,EPN#39
5038.  000030  1  1                                                                                              !B00,EPN#39
5039.  000030  1  1   FIXED     TIMERECVD;                                                                       !B00,EPN#39
5040.  000030  1  1   FIXED     RCLK^RECVD;                                                                      !B00,EPN#39
5041.  000030  1  1   FIXED     RCLK^DELTA;                                                                      !B00,EPN#39
5042.  000030  1  1   FIXED     TIMERECVDAC;                                                                     !B00,EPN#39
5043.  000030  1  1   FIXED     AVERAGETIME;                                                                     !B00,EPN#39
5044.  000030  1  1   FIXED     ELAPSEDTIME;                                                                     !B00,EPN#39
5045.  000030  1  1   FIXED     ELAPSEDTIMEP2;                                                                   !B00,EPN#39
5046.  000030  1  1   INT       P1TRANSITS;                                                                      !B00,EPN#39
5047.  000030  1  1   FIXED     P1AVGTRANTIME;                                                                   !B00,EPN#39
5048.  000030  1  1                                                                                              !B00,EPN#39
```

```
5049.  000030 1      INT      P1AVGTRANTIME^INT = P1AVGTRANTIME + 3;      !B00,EPN#39
5050.  000030 1      FIXED    P1TRANTIMESUM;                              !B00,EPN#39
5051.  000030 1      INT      P2TRANSITS;                                 !B00,EPN#39
5052.  000030 1      FIXED    P2TRANSITSUM;                               !B00,EPN#39
5053.  000030 1      INT      P2AVGTRANTIME;                              !B00,EPN#39
5054.  000030 1      FIXED    P2AVGTRANTIME^INT = P2AVGTRANTIME + 3;      !B00,EPN#39
5055.  000030 1      INT      P2TRANTIMESUM;                              !B00,EPN#39
5056.  000030 1      FIXED    VOTERS^AVGADJUSTMENTS;                      !B00,EPN#39

5083.  000030 1      INT  SUBPROC LONG^TRANTIME (TRANTIME);               !B00,EPN#39
5084.  000030 2      INT  TRANTIME;                                       !B00,EPN#39
5085.  000030 2                                                           !B00,EPN#39
5086.  000030 2      BEGIN                                                !B00,EPN#39
5087.  000030 2      INT NORMALTRANTIME;                                  !B00,EPN#39
5088.  000030 2                                                           !B00,EPN#39
5089.  000030 2      IF 0 THEN           ! ***** DEBUG ******* !          !B00,EPN#39
5090.  000036 2      BEGIN                                                !B00,EPN#39
5091.  000036 2         STACK OD, 0, TRANTIME;                            !B00,EPN#39
5092.  000041 2         STORE TCB.SVSGENTIME;                             !B00,EPN#39
5093.  000044 2      END;                                                 !B00,EPN#39
5094.  000044 2                                                           !B00,EPN#39
5095.  000044 2      IF TRANTIME < NORMALTRANTIME THEN                    !B00,EPN#39
5096.  000050 2      BEGIN          ! THIS TRANSIT TIME < PREVIOUS MINIMUM !B00,EPN#39
5097.  000050 3         IF TRANTIME < 0 THEN                              !B00,EPN#39
5098.  000053 3            RETURN -2;  ! ??                               ! B00,EPN#39
5099.  000056 3                                                           !B00,EPN#39
5100.  000056 3         TCB.NORMALTRANTIME := TRANTIME;  ! NEW MINIMUM    !B00,EPN#39
5101.  000062 3      END                                                  !B00,EPN#39
5102.  000062 2      ELSE                                                 !B00,EPN#39
5103.  000063 2      BEGIN          ! THIS TRANSIT TIME > PREVIOUS MINIMUM !B00,EPN#39
5104.  000063 3         IF TRANTIME > (NORMALTRANTIME + TRANTIMEDEVIATION) THEN !B00,EPN#39
5105.  000070 3         BEGIN                                             !B00,EPN#39
5106.  000070 4            ! THIS PACKET'S TRANSIT TIME > AVERAGE; IGNORE IT ! !B00,EPN#39
5107.  000070 4            TCB.TCBTIMEAVERAGED := 0;  ! INHIBIT AVERAGING ! !B00,EPN#39
5111.  000073 4            ! INCREASE NORMALTRANTIME, OTHERWISE WE MIGHT NEVER SYNC AGAIN ! !B00,EPN#39
5112.  000073 4            TCB.NORMALTRANTIME := (NORMALTRANTIME + TRANTIMEDEVIATION); !B00,EPN#39
5113.  000100 4            RETURN -1;  ! TRANTIME TOO LONG                !B00,EPN#39
5114.  000103 4         END;         ! TRANSIT TIME > NORMAL + TCB.NORMALTRANTIME !B00,EPN#39
5115.  000103 3                                                           !B00,EPN#39
5116.  000103 3      END;            ! TRANSIT TIME > TRANTIME ACCEPTABLE !B00,EPN#39
5117.  000103 2                                                           !B00,EPN#39
5118.  000103 2      RETURN 0;    ! TRANTIME ACCEPTABLE                   !B00,EPN#39
5119.  000106 2      END;  ! LONG^TRANTIME                                !B00,EPN#39

NORMALTRANTIME            Variable    INT     Direct   S  -000
TRANTIME                  Variable    INT     Direct   S  -002

5121.  000106 1      SUBPROC INITIAL^SYNC;                                !B00,EPN#39
5122.  000106 2      BEGIN                                                !B00,EPN#39
5123.  000106 2      ! It is time to set the clock in this cpu.           !B00,EPN#39
5124.  000106 2      ! TIMERECVD contains the RCLK value from the call at the beginning of !B00,EPN#39
5125.  000106 2      ! this proc.  Therefore,                             !B00,EPN#39
5126.  000106 2      ! TIMERECVD = CLOCKBASE + <hardware counter value>   !B00,EPN#39
5127.  000106 2      ! Then, (CLOCKBASE - TIMERECVD)                      !B00,EPN#39
5128.  000106 2      !     = CLOCKBASE - (CLOCKBASE + <hardware counter value>) !B00,EPN#39
5129.  000106 2      !     = CLOCKBASE - CLOCKBASE - <hardware counter value>  !B00,EPN#39
```

```
5130.   000106  2  !                     - <hardware counter value>                                        !B00,EPN#39
5131.   000106  2  !                                                                                      !B00,EPN#39
5132.   000106  2  ! AVERAGETIME = TIMERECVDAC, the corrected clock, of the voter CPU,                    !B30,EPN#47
5133.   000106  2  ! adjusted for transit delay.                                                          !B30,EPN#47
5134.   000106  2  ! We set this cpu's clock to the voter cpu's clock                                     !B30,EPN#47
5135.   000106  2  ! minus <hardware counter value>                                                       !B30,EPN#47
5136.   000106  2  ! plus TOTAL - AVG ADJUSTMENTS   (from the voter CPU).                                 !B30,EPN#47
5137.   000106  2  ! This is equivalent to setting the clock to the corrected clock of the                !B30,EPN#47
5138.   000106  2  ! value and reseting the hardware counter.                                             !B30,EPN#47
5139.   000106  2                                                                                         !B30,EPN#47
5142.   000106  2     TCB.TOTALADJUSTMENTS := VOTERSAVGADJUSTMENTS;                                       !B30,EPN#47
5143.   000113  2     TCB.AVGADJUSTMENTS    := 0F;                                                        !B30,EPN#47
5149.   000120  2                                                                                         !B00,EPN#39
5150.   000120  2     CLOCKBASE := AVERAGETIME                                                            !B00,EPN#39
5151.   000120  2                - TIMERECVD + CLOCKBASE                                                  !BAA,EPN#39
5152.   000120  2                + TCB.TOTALADJUSTMENTS;                                                  !B00,EPN#39
5153.   000136  2                                                                                         !B00,EPN#39
5154.   000136  2     TCB.TCBTIMECHANGED := -1;      ! set flag to indicate clock reset !                 !B00,EPN#39
5155.   000142  2     TCB.TCBTIMESETTER  := 1;       ! we were the last to set it       !                 !B00,EPN#39
5156.   000147  2                                                                                         !B00,EPN#39
5157.   000147  2     TCB.TOTALADJUSTMENTS := TCB.TOTALADJUSTMENTS                                        !B00,EPN#39
5158.   000147  2                          - TCB.AVGADJUSTMENTS                                           !B00,EPN#39
5159.   000147  2                          - TCB.EXTADJUSTMENTS;                                          !B00,EPN#39
5160.   000165  2                                                                                         !B00,EPN#39
5163.   000165  2     TCB.AVGCORRECT.DAMPIDX := 0;                                                        !B00,EPN#39
5164.   000171  2     TCB.CURRENTADJUSTMENT[0].TICK[0] ':=' [5*[0]];                                      !B00,EPN#39
5168.   000200  2  END;  ! INITIALASYNC                                                                   !B00,EPN#39

5168.02  000207  1  SUBPROC PFAILASYNC;                                                                   !B30,EPN#47
5168.03  000207  2  BEGIN                                                                                 !B30,EPN#47
5168.04  000207  2  FIXED LOSTATIME;                                                                      !B30,EPN#47
5168.05  000207  2                                                                                        !B30,EPN#47
5168.06  000207  2  ! We want to synchronize all clocks to either:                                        !B30,EPN#47
5168.07  000207  2  !  1. The clock of a cpu which did not lose power and is still correct                !B30,EPN#47
5168.08  000207  2  !  2. If all cpus lost power, then the fastest clock.                                 !B30,EPN#47
5168.09  000207  2  !                                                                                     !B30,EPN#47
5168.1   000207  2  ! The PFAIL packet should contain the TIMERECVD and AVGADJUSTMENTS of                 !B30,EPN#47
5168.11  000207  2  ! one of the above.                                                                   !B30,EPN#47
5168.12  000207  2  !                                                                                     !B30,EPN#47
5168.13  000207  2  ! We do not perform the same computations that INITIALASYNC performs.                 !B30,EPN#47
5168.14  000207  2  ! Instead, we allow the clock to "jump" by adjusting it to match the                  !B30,EPN#47
5168.15  000207  2  ! clock in the PFAIL TSYNC packet.                                                    !B30,EPN#47
5168.16  000207  2                                                                                        !B30,EPN#47
5168.17  000207  2  ! Compute time lost during power outage: difference of corrected clocks.              !B30,EPN#47
5168.18  000207  2                                                                                        !B30,EPN#47
5168.19  000207  2     LOSTATIME := AVERAGETIME - TIMERECVDAC;                                            !B30,EPN#47
5168.2   000207  2                                                                                        !B30,EPN#47
5168.21  000217  2  IF 0 THEN TCB.SYSGENTIME := LOSTATIME;   ! ****** DEBUG ******                        !B30,EPN#47
5168.22  000217  2                                                                                        !B30,EPN#47
5168.23  000226  2  IF LOSTATIME > 0 OF THEN  ! my clock has lost time                                    !B30,EPN#47
5168.24  000226  2    BEGIN                                                                               !B30,EPN#47
5168.25  000234  2    ! When power is restored to the system after a failure, each          !             !B30,EPN#47
5168.251 000234  3    ! processor power supply takes a different amount of time to          !             !B30,EPN#47
5168.252 000234  3    ! attain full power.  This results in the cpus starting at            !             !B30,EPN#47
5168.253 000234  3
```

```
5168.254  000234  2                    ! times. We expect every processor to start within a few seconds. !  !B30,EPN#47
5168.255  000234  2                    ! otherwise it will be declared down by the others.               !  !B30,EPN#47
5168.256  000234  2                                                                                         !B30,EPN#47
5168.257  000234  3                    IF LOSTATIME > 10000000F THEN ! more than 10 seconds; impossible !    !B30,EPN#47
5168.258  000234  3                      PROCESSOR^HALT (TIMABADCLOCK);                                      !B30,EPN#47
5168.259  000244  3                                                                                          !B30,EPN#47
5168.26   000251  2                      CLOCKBASE := CLOCKBASE + LOSTATIME;    ! set it ahead               !B30,EPN#47
5168.27   000260  2                      TCB.TCBTIMECHANGED := -1;  ! set flag to indicate clock reset       !B30,EPN#47
5168.28   000264  2                      TCB.TCBTIMESETTER := 4;    ! PFAILATSYNC was the last to set it !   !B30,EPN#47
5168.29   000271  2                    END;                                                                  !B30,EPN#47
5168.3    000271  2                                                                                          !B30,EPN#47
5168.31   000271  2                    TCB.TCBPOWERFAILED := 0;   ! we have recovered !                      !B30,EPN#47
5168.32   000275  2                                                                                          !B30,EPN#47
5168.33   000275  2                    ! If the voter's cpu did not suffer power failure,                    !B30,EPN#47
5168.34   000275  2                    ! then my clock has been accurately set and I do not                  !B30,EPN#47
5168.35   000275  2                    ! need a SETTIME.                                                     !B30,EPN#47
5168.36   000275  2                                                                                          !B30,EPN#47
5168.37   000275  2                    IF NOT PIOP.TSYNC.TIMESYNCVOTERSCLOCKBAD THEN                         !B30,EPN#47
5168.38   000301  2                      TCB.TCBNEEDSETTIME := 0;                                            !B30,EPN#47
5168.39   000304  2                                                                                          !B30,EPN#47
5168.4    000304  2                    TCB.AVGCORRECT.DAMPIDX := 0;                                          !B30,EPN#47
5168.5    000310  2                    TCB.CURRENTADJUSTMENT[0].TICK[0] ':=' [5*[0]];                        !B30,EPN#47
5168.6    000317  2                                                                                          !B30,EPN#47
5168.7    000317  2                    END;  ! PFAILASYNC                                                    !B30,EPN#47

LOSTATIME                               Variable    FIXED (0)    Direct       S -003

5170.     000327  1                    SUBPROC APPLY^CORRECTION;                                             !B00,EPN#39
5171.     000327  1                    BEGIN                                                                 !B00,EPN#39
5172.     000327  2                    INT(32)  TEMP;                                                        !B00,EPN#39
5173.     000327  2                    INT(32)  PERM;                                                        !B00,EPN#39
5174.     000327  2                    INT(32)  ITIME;                                                       !B00,EPN#39
5175.     000327  2                    INT      ITIME16 = ITIME+1;                                           !B00,EPN#39
5176.     000327  2                    INT      DAMPIDX;                                                     !B00,EPN#39
5177.     000327  2                    INT      SYNCD^CPUS := TCB.TCBSYNCDCPUCNT;  ! NUMBER OF SYNCD CPUS !  !B00,EPN#39
5178.     000327  2                                                                                          !B00,EPN#39
5179.     000327  2                    ! Each time the following line of code is executed, DAMPIDX will increase. !  !B00,EPN#39
5180.     000327  2                    ! When it equals 15, it will stay equal to 15 until a time set message is   !  !B00,EPN#39
5181.     000327  2                    ! received. It is then reset to zero.                                        !  !B00,EPN#39
5182.     000327  2                    ! Note that as DAMPIDX increases, the PERM and TEMP damping multipliers      !  !B00,EPN#39
5183.     000327  2                    ! (see local array declarations) will decrease. This has the effect of       !  !B00,EPN#39
5184.     000327  2                    ! causing maximum damping after the initial reload and after SETTIMEs.       !  !B00,EPN#39
5185.     000327  2                                                                                          !B00,EPN#39
5186.     000327  2                    TCB.AVGCORRECT.DAMPIDX := NEXT^DAMPIDX [DAMPIDX := TCB.AVGCORRECT.DAMPIDX];  !B00,EPN#39
5187.     000327  2                                                                                          !B00,EPN#39
5188.     000344  2                    IF SYNCD^CPUS = 1 AND IMSENDER THEN  ! ONLY ONE CPU SYNCD - ME !      !B00,EPN#39
5189.     000351  2                      BEGIN                              ! MAKE NO ADJUSTMENTS !          !B00,EPN#39
5190.     000351  2                      TCB.AVGCORRECT.PERM := 0D;                                          !B00,EPN#39
5191.     000355  2                      TCB.AVGCORRECT.TEMP := 0D;                                          !B00,EPN#39
5192.     000355  3                      TCB.CURRENTADJUSTMENT[0].TICK[0] := 0;                              !B00,EPN#39
5193.     000361  3                      TCB.CURRENTADJUSTMENT[0].TICK[1] := 0;                              !B00,EPN#39
5194.     000365  2                      END  ! ONLY ONE CPU SYNCD !                                         !B00,EPN#39
5195.     000371  2                    ELSE                                                                  !B00,EPN#39
5196.     000371  2                      BEGIN                              ! MORE THAN ONE CPU SYNCD !      !B00,EPN#39
5197.     000373  2                                                                                          !B00,EPN#39
```

```
5198.                             ! Compute difference of average clock rate and my clock rate.        !B00,EPN#39
5199.                             ! PERM =                  (my cpu raw clock change since last timesync message) !B00,EPN#39
5200.                             !             - (change of average of all cpus raw clocks)            !B00,EPN#39
5201.                             ! This value is a measure of the difference in clock RATES.           !B00,EPN#39
5202.                             ! Note that this computation is independent of when we actually received !B00,EPN#39
5203.                             ! last timesync message.                                              !B00,EPN#39
5204.
5205. 000373 2 3                  STACK TIMERECVD   - TCB.AVGCORRECT.PREVRAWTIME  ! my cpu's raw clock!  !B00,EPN#39
5206. 000373 2 3                      - AVERAGETIME + TCB.AVGCORRECT.PREVAVGTIME; ! all raw clocks      !B00,EPN#39
5207. 000373 2 3                  STORE ITIME; CODE (STRP $RP-2);                                       !B00,EPN#39
5208.
5209. 000410 2 3                  PERM := TCB.AVGCORRECT.PERM;                                          !B00,EPN#39
5210.
5211. 000412 2 3                  USE DM;                                                               !B00,EPN#39
5212. 000416 2 3                  DM := $MIN(PERMADAMPAMUL[DAMPIDX], DAMPINGAFACTOR);                   !B00,EPN#39
5213. 000416 2 3                  PERM := ( ( $UDBL(DAMPINGAFACTOR - DM) * PERM) + ($UDBL(DM) * ITIME) ) !B00,EPN#39
5214. 000426 2 3                      / $UDBL(DAMPINGAFACTOR);                                          !B00,EPN#39
5215. 000444 2 3                  DROP DM;                                                              !B00,EPN#39
5216.
5217. 000444 2 3                  TCB.AVGCORRECT.PERM := PERM;                                          !B00,EPN#39
5218.
5219.                             ! We now compute:   (my cpu raw clock time received + AVGADJUSTMENTS)  !B00,EPN#39
5220.                             !                 - (average of all cpus raw clocks since last sync    ) !B00,EPN#39
5221.                             ! This value is a measure of the difference in clock TIMES.           !B00,EPN#39
5222.
5223. 000450 2 3                  STACK TIMERECVDAC - AVERAGETIME;                                      !B00,EPN#39
5224. 000450 2 3                  STORE ITIME; CODE (STRP $RP-2);                                       !B00,EPN#39
5225.
5226. 000455 2 3                  TEMP := TCB.AVGCORRECT.TEMP;                                          !B00,EPN#39
5227.
5228. 000463 2 3                  USE DM;                                                               !B00,EPN#39
5229. 000463 2 3                  DM := $MIN(TEMPADAMPAMUL[DAMPIDX], DAMPINGAFACTOR);                   !B00,EPN#39
5230. 000463 2 3                  TEMP := ( ( $UDBL(DAMPINGAFACTOR - DM) * TEMP) + ($UDBL(DM) * ITIME) ) !B00,EPN#39
5231. 000473 2 3                      / $UDBL(DAMPINGAFACTOR);                                          !B00,EPN#39
5232. 000511 2 3                  DROP DM;                                                              !B00,EPN#39
5233.
5234. 000511 2 3                  TCB.AVGCORRECT.TEMP := TEMP;                                          !B00,EPN#39
5235.
5236. 000515 2 3                  TCB.CURRENTADJUSTMENT[0].LIMIT   := 5 * CORINT;                       !B00,EPN#39
5237. 000515 2 3                  TCB.CURRENTADJUSTMENT[0].COUNT   := - CORINT;                         !B00,EPN#39
5238.
5239. 000521 2 3                  ITIME := - TEMP;                                                      !B00,EPN#39
5240. 000525 2 3                  IF ITIME > +(MAXCOR '*' CORINT) THEN ITIME := +(MAXCOR '*' CORINT);   !B00,EPN#39
5241. 000530 2 3                  IF ITIME < -(MAXCOR '*' CORINT) THEN ITIME := -(MAXCOR '*' CORINT);   !B00,EPN#39
5242. 000542 2 3                  TCB.CURRENTADJUSTMENT[0].TICK[0] := ITIME16 / CORINT;                 !B00,EPN#39
5243.
5244. 000554 2 3                  ITIME := - PERM;                                                      !B00,EPN#39
5245. 000562 2 3                  IF ITIME > +(MAXCOR '*' CORINT) THEN ITIME := + (MAXCOR '*' CORINT);  !B00,EPN#39
5246. 000565 2 3                  IF ITIME < -(MAXCOR '*' CORINT) THEN ITIME := - (MAXCOR '*' CORINT);  !B00,EPN#39
5247. 000601 2 3                  TCB.CURRENTADJUSTMENT[0].TICK[1] := ITIME16 / CORINT;                 !B00,EPN#39
5248.
5249. 000613 2 3                  TCB.TCBSYNCCOUNT := (TCB.TCBSYNCCOUNT + 1) LAND 7;                    !B00,EPN#39
5250. 000624 2 3                                                       ! MORE THAN ONE CPU SYNCD !      !B00,EPN#39
5251. 000624 2 2                  END;                                                                  !B00,EPN#39
5252. 000636 2
```

```
5253.                                                                                                          !B00,EPN#39
5254.   000636  2                                                                                              !B00,EPN#39
        000636  2    2  END;  ! APPLY^CORRECTION

DAMPIDX                  Variable      INT         Direct    S -001
ITIME                    Variable      INT         Direct    S -003
ITIME16                  Variable      INT  (32)   Direct    S -002
PERM                     Variable      INT  (32)   Direct    S -005
SYNCD^CPUS               Variable      INT  (32)   Direct    S -000
TEMP                     Variable      INT  (32)   Direct    S -007

5256.                          ! TIMESYNCMSG proc begins here                                                  !B00,EPN#39
5257.   000640  1                                                                                              !B00,EPN#39
5258.   000640  1          TIMESYNCD := TCB.TCBTIMESYNCD;                                                      !B00,EPN#39
5259.   000660  1          CODE( RCLK );                                                                       !B00,EPN#39
5260.   000661  1          STORE RCLK^RECVD;                                                                   !B00,EPN#39
5261.   000663  1                                                                                              !B00,EPN#39
5262.   000663  1          CODE (STRP $RP+4);         ! get RCLK back !                                        !B00,EPN#39
5263.   000664  1          IF TIMESYNCD THEN                                                                   !B00,EPN#39
5264.   000666  1            BEGIN                                                                             !B00,EPN#39
5265.   000666  2              STACK TCB.TOTALADJUSTMENTS;                                                     !B00,EPN#39
5266.   000671  2              CODE (QSUB);                                                                    !B00,EPN#39
5267.   000672  2            END;                                                                              !B00,EPN#39
5268.   000672  1          STORE TIMERECVD;            ! raw !                                                 !B00,EPN#39
5269.   000674  1                                                                                              !B00,EPN#39
5270.   000674  1          CODE (STRP $RP+4);         ! get TIMERECVD back !                                   !B00,EPN#39
5271.   000675  1          IF TIMESYNCD THEN                                                                   !B00,EPN#39
5272.   000677  1            BEGIN                                                                             !B00,EPN#39
5273.   000677  2              STACK TCB.AVGADJUSTMENTS;                                                       !B00,EPN#39
5274.   000702  2              CODE (QADD);                                                                    !B00,EPN#39
5275.   000703  2            END;                                                                              !B00,EPN#39
5276.   000703  1          STORE TIMERECVD^C;  !corrected!                                                     !B00,EPN#39
5277.   000705  1                                                                                              !B00,EPN#39
5278.   000705  1          IMSENDER := (ORGCPU := PIOP.TSYNC.TIMESYNCORGCPU) = CPU;                             !B00,EPN#39
5279.   000720  1                                                                                              !B00,EPN#39
5280.   000720  1          FROMLOCKER := PIOP.TSYNC.TIMESYNCALLCPUS;                                           !B00,EPN#39
5281.   000724  1                                                                                              !B00,EPN#39
5282.   000724  1          PASS2 := PIOP.TSYNC.TIMESYNCPASS2;                                                  !B00,EPN#39
5283.   000730  1                                                                                              !B00,EPN#39
5284.   000730  1          ELAPSEDTIME := TIMERECVD - TCB.LASTSYNC.RAWTIMESTAMP;                               !B00,EPN#39
5285.   000740  1                                                                                              !B00,EPN#39
5285.9  000740  1          IF NOT TIMESYNCD AND TCB.NORMALTRANTIME < 1200 THEN                                 !B00,EPN#40
5286.   000751  1            TCB.NORMALTRANTIME := 1200;   ! INITIALIZATION !                                  !B00,EPN#4p
5289.   000755  1                                                                                              !B00,EPN#39
5290.   000757  1          IF PASS1 THEN                                                                       !B00,EPN#39
5291.   000757  2            BEGIN  ! PASS1                                                                    !B00,EPN#39
5292.   000757  2              PIOP.TSYNC.TIMESYNCP1CPUCNT :=                                                  !B00,EPN#39
5293.   000771  2                PITRANSITS := PIOP.TSYNC.TIMESYNCP1CPUCNT + 1;                                !B00,EPN#39
5294.   000773  1                                                                                              !B00,EPN#39
5295.   000773  2            IF TIMESYNCD THEN                                                                 !B00,EPN#39
5296.   000775  3              BEGIN                                                                           !B00,EPN#39
5297.   000775  3                IF FROMLOCKER THEN                                                            !B00,EPN#39
5298.   001002  4                  BEGIN  ! THIS IS A NORMAL (NON-RELOAD) TSYNC !                              !B00,EPN#39
5299.   001002  4                    IF TCB.AVGCORRECT.DAMPIDX > VOTING^DAMPIDX THEN                           !B00,EPN#39
5300.   001002  5                      BEGIN  ! contribute to AVG !                                            !B00,EPN#39
5301.   001013  5                        PIOP.TSYNC.TIMEAVG := PIOP.TSYNC.TIMEAVG + TIMERECVD;                 !B00,EPN#39
5302.   001022  5                        PIOP.TSYNC.TIMESYNCVOTECNT := PIOP.TSYNC.TIMESYNCVOTECNT + 1;         !B00,EPN#39
5303.   001022  4                      END;                                                                   !B00,EPN#39
```

```
5304.      001022  1  4                    END          ! FROMLOCKER                                                              !B00,EPN#39
5305.      001022  1  3                ELSE                                                                                        B00,EPN#39
5306.4     001023  1  4                  BEGIN   ! NOT FROMLOCKER; RELOAD OR PFAIL TSYNC PACKET                                   !B10,EPN#42
5306.7     001023  1  4                                                                                                           !B10,EPN#42
5307.3     001023  1  4                    IF (NOT PIOP.TSYNC.TIMESYNCPFAIL  ! RELOAD TSYNC packet                                !B10,EPN#42
5307.6     001023  1  4                         AND   ! my clock has been running longer than voter's                             !B10,EPN#42
5307.9     001023  1  4                         TCB.AVGCORRECT.DAMPIDX >= PIOP.TSYNC.TIMESYNCP2CPUCNT)                             !B10,EPN#42
5308.6     001023  1  4                       OR                                                                                  !B10,EPN#42
5310.      001023  1  4                       (PIOP.TSYNC.TIMESYNCPFAIL  ! PFAIL TSYNC packet                                     !B30,EPN#47
5310.1     001023  1  4                         AND                                                                               !B30,EPN#47
5311.2     001023  1  4                         ! my clock is greater than voter's clock; use mine                                !B30,EPN#47
5311.3     001052  1  4                         TIMERECVDAC > PIOP.TSYNC.TIMEAVG)                                                  B30,EPN#47
5311.8     001052  1  5                     THEN                                                                                  !B30,EPN#47
5311.9     001057  1  5                       BEGIN ! My clock is better than voter's                                             !B30,EPN#47
5312.      001057  1  5                         PIOP.TSYNC.TIMEAVG := TIMERECVDAC;  ! Use corrected clock                         !B30,EPN#47
5312.1     001071  1  5                         PIOP.TSYNC.SOMEATIME := TCB.TOTALADJUSTMENTS                                      !B30,EPN#47
5312.7     001076  1  5                                               - TCB.AVGADJUSTMENTS;                                        B30,EPN#47
5313.      001101  1  5                         PIOP.TSYNC.TIMESYNCVOTECNT := 1;                                                  !B10,EPN#42
5313.3     001111  1  5                         PIOP.TSYNC.P1TRANSITSUM := 0;                                                     !B10,EPN#42
5313.4     001122  1  5                         PIOP.TSYNC.TIMESYNCP2CPUCNT := TCB.AVGCORRECT.DAMPIDX;                             B30,EPN#47
5313.9     001122  1  4                         PIOP.TSYNC.TIMESYNCVOTERSCLOCKBAD := TCB.TCBPOWERFAILED;                          !B10,EPN#42
5316.      001122  1  3                       END; ! exclusive vote !                                                              B00,EPN#39
5317.      001122  1  2                                                                                                           !B00,EPN#39
5318.      001122  1  2                    END;    ! NOT FROMLOCKER                                                                B00,EPN#39
5319.      001122  1  2                                                                                                           !B00,EPN#39
5320.      001122  1  2                  END;    ! TIMESYNCD                                                                      !B00,EPN#39
5322.      001131  1  2                                                                                                           !B00,EPN#39
5323.      001133  1  2                  IF 0 THEN TCB.SYSGENTIME := TIMERECVD;  ! ***** DEBUG *****                               !B00,EPN#39
5324.      001133  1  3                  IF IMSENDER THEN                                                                          B30,EPN#47
5325.      001133  1  3                    BEGIN                                                                                  !B00,EPN#39
5327.      001142  1  3                    ! THIS IS THE SECOND TIME THIS CPU HAS SEEN THE PACKET                                 !B00,EPN#39
5328.      001142  1  3                      PIOP.TSYNC.TIMESYNCPASS2 := PASS2 := -1;                                             !B00,EPN#39
5329.      001145  1  3                    ! COMPUTE PASS1 AVERAGE TRANSIT TIME !                                                 !B00,EPN#39
5329.1     001145  1  4                      IF P1TRANSITS > 1 THEN                                                                B30,EPN#47
5330.2     001154  1  4                        BEGIN                                                                              !B30,EPN#47
5330.3     001162  1  4                          P1AVGTRANTIME := ELAPSEDTIME / $FIX (P1TRANSITS) ;                                B20,EPN#43
5330.4     001162  1  5                          IF LONGATRANTIME > (P1AVGTRANTIMEAINT) THEN                                      !B20,EPN#43
5331.      001164  1  5                            BEGIN                                                                          !B20,EPN#43
5331.1     001173  1  5                              ! THIS IS MY INITIAL TSYNC - RETRY IT                                        !B20,EPN#43
5332.      001175  1  5                              CALL SENDTIMESYNC(TSYNCAINITIAL, PIOP.TSYNC.TIMESYNCPFAIL);                   B20,EPN#43
5333.      001175  1  4                                                                                                           !B00,EPN#39
5334.      001175  1  3                              RETURN;  ! THIS PACKET TOOK TOO LONG; DON'T USE IT !                         !B00,EPN#39
5335.      001176  1  3                            END;    ! LONGATRANTIME                                                        !B00,EPN#39
5336.      001202  1  3                                                                                                            B00,EPN#39
5337.      001202  1  3                        END           ! P1TRANSITS > 1                                                     !B00,EPN#39
5338.      001204  1  3                      ELSE                                                                                 !B00,EPN#39
5340.      001204  1  4                        P1AVGTRANTIME := 0F;   ! P1TRANSITS <= 1                                           !B00,EPN#39
5341.      001211  1  4                                                                                                           !B00,EPN#39
5342.      001216  1  4                    IF NOT FROMLOCKER THEN ! THIS IS A RELOAD TSYNC PACKET                                 !B00,EPN#39
5343.      001216  1  3                      BEGIN                                                                                !B00,EPN#39
                                               PIOP.TSYNC.TIMESYNCP2CPUCNT := 0;  ! THIS WAS USED FOR DAMPIDX
                                               VOTERSAAVGADJUSTMENTS := PIOP.TSYNC.SOMEATIME; ! SAVE IT
                                             END;
```

```
5344.   001216 1 3              PIOP.TSYNC.SOMEATIME := P1AVGTRANTIME;                                  !B00,EPN#39
5345.   001223 1 3            END;   ! IMSENDER                                                          !B00,EPN#39
5346.   001223 1 2                                                                                       !B00,EPN#39
5347.   001223 1 2          END  ! PASS1 !                                                               !B00,EPN#39
5348.   001223 1 2        ELSE  ! PASS2 - PACKET IS ALREADY ON SECOND PASS                               !B00,EPN#39
5349.   001224 1 1        BEGIN                                                                          !B00,EPN#39
5350.   001224 1 2                                                                                       !B00,EPN#39
5351.   001224 1 2          IF IMSENDER AND FROMLOCKER THEN                                              !B00,EPN#39
5352.   001230 1 2            RETURN;  ! THIS IS THE THIRD TIME THIS CPU HAS SEEN PACKET !               !B00,EPN#39
5353.   001231 1 2                                                                                       !B00,EPN#39
5354.   001231 1 2          END;  ! PASS2 !                                                              !B00,EPN#39

5356.   001231 1 1          IF PASS2 THEN                                                                !B00,EPN#39
5357.   001231 1 1          BEGIN  ! PASS2 - EITHER IT WAS OR IT BECAME THE SECOND PASS                  !B00,EPN#39
5358.   001233 1 2            IF TCB.LASTSYNC.SENDINGCPU = ORGCPU AND                                    !B00,EPN#39
5359.   001233 1 2               TCB.LASTSYNC.GLUPSEQNO = PIOP.UPSEQ  THEN                               !B00,EPN#39
5360.   001250 1 2                                                                                       !B00,EPN#39
5361.   001250 1 2            BEGIN                                                                      !B00,EPN#39
5362.   001250 1 3              IF (CPUVOTES := PIOP.TSYNC.TIMESYNCVOTECNT) THEN                         !B00,EPN#39
5363.   001255 1 3              BEGIN                                                                    !B00,EPN#39
5364.   001255 1 4                ! SUM OF CLOCKS MUST BE CORRECTED FOR TIME SPENT TRAVELLING.           !B00,EPN#39
5365.   001255 1 4                ! FIRST PASS TRANSIT TIMES ARE SHORTER THAN SECOND PASS TIMES.         !B00,EPN#39
5366.   001255 1 4                ! WE SAVED THE FIRST PASS AVERAGE TRANSIT TIME IN THE TSYNC PKT        !B00,EPN#39
5367.   001255 1 4                ! AND THE PACKET HAS A COUNT OF CPUS THAT HAVE SEEN IT                 !B00,EPN#39
5368.   001255 1 4                ! PASS, AND WE CAN COMPUTE THE ELAPSED TIME SINCE WE LAST SAW IT,      !B00,EPN#39
5369.   001255 1 4                ! SO WE CAN COMPUTE THE SECOND PASS AVERAGE TRANSIT TIME.              !B00,EPN#39
5370.   001255 1 4                                                                                       !B00,EPN#39
5371.   001255 1 4                P1TRANSITS := PIOP.TSYNC.TIMESYNCP1CPUCNT;                             !B00,EPN#39
5372.   001262 1 4                P1AVGTRANTIME := PIOP.TSYNC.SOMEATIME;                                 !B00,EPN#39
5373.   001267 1 4                                                                                       !B00,EPN#39
5374.   001267 1 4                ! COMPUTE PASS1 TOTAL TRANSIT TIME                            !        !B00,EPN#39
5375.   001267 1 4                P1TRANTIMESUM := $FIX ( PIOP.TSYNC.P1TRANSITSUM ) * P1AVGTRANTIME;     !B00,EPN#47
5376.   001267 1 4                                                                                       !B00,EPN#39
5381.   001277 1 4                P2TRANSITS := PIOP.TSYNC.TIMESYNCP2CPUCNT;                             !B00,EPN#39
5382.   001277 1 4                P2TRANSITSUM := P2TRANSITS * PIOP.TSYNC.TIMESYNCVOTECNT;               !B00,EPN#47
5383.   001304 1 4                IF P2TRANSITS THEN                                                     !B00,EPN#39
5386.   001312 1 4                BEGIN                                                                  !B00,EPN#39
5387.   001314 1 4                  ! Compute PASS2 average transit time                                 !B30,EPN#47
5388.   001314 1 5                  ! Note that ELAPSEDTIME is NOT the time the packet started.   !      !B30,EPN#47
5388.1  001314 1 5                  ! but rather, the time since I last saw the packet.                  !B30,EPN#47
5388.2  001314 1 5                                                                                       !B30,EPN#47
5388.3  001314 1 5                  ELAPSEDTIMEP2 := ELAPSEDTIME                                         !B30,EPN#47
5389.   001314 1 5                                  - ( P1AVGTRANTIME * $FIX (P1TRANSITS - P2TRANSITS) );!B30,EPN#47
5390.   001314 1 5                                                                                       !B30,EPN#47
5391.   001335 1 5                  P2AVGTRANTIME := ELAPSEDTIMEP2 / $FIX (P2TRANSITS);                  !B30,EPN#47
5396.   001335 1 5                  P2TRANTIMESUM := P2AVGTRANTIME * $FIX (P2TRANSITSUM);                !B30,EPN#47
5397.   001344 1 5                END ! P2TRANSITS > 0 !                                                 !B30,EPN#47
5405.   001353 1 4                ELSE                                                                   !B30,EPN#47
5405.1  001354 1 4                  P2TRANTIMESUM := 0F;                                                 !B30,EPN#47
5405.2  001360 1 4                                                                                       !B30,EPN#47
5405.3  001360 1 4                ! We now compute the average clock value of all voter CPUs             !B30,EPN#47
5407.   001360 1 4                ! It is equal to the sum of the voters' clocks (TIMEAVG)               !B30,EPN#47
5407.1  001360 1 4                ! plus the amount of time each clock value spent in transit.           !B30,EPN#47
5407.2  001360 1 4
5407.3  001360 1 4
```

```
5409.       001360  4              AVERAGETIME :=                                                               !B30,EPN#47
5410.       001360  4                  (PIOP.TSYNC.TIMEAVG + P1TRANTIMESUM + P2TRANTIMESUM)                      !B30,EPN#47
5411.       001360  4                  / $FIX (CPUVOTES) ;                                                       !B30,EPN#47
5412.       001376  1              END        ! CPUVOTES > 0 !                                                  !B00,EPN#39
5413.       001376  3          ELSE                                                                             !B00,EPN#39
5414.       001377  1              BEGIN   ! CPUVOTES = 0 !                                                     !B00,EPN#39
5415.8      001377  4              AVERAGETIME := TIMERECVD;                                                    !B30,EPN#47
5415.9      001403  1              END;    ! CPUVOTES = 0 !                                                     !B00,EPN#39
5430.       001403  3          IF TIMESYNCD AND NOT PIOP.TSYNC.TIMESYNCPFAIL THEN                                !B00,EPN#39
5431.       001411  1              BEGIN   ! Apply Average !                                                    !B00,EPN#39
5432.       001411  3              IF TCB.TCBTIMEAVERAGED THEN                                                  !B00,EPN#39
5433.       001411  4                  BEGIN                                                                    !B00,EPN#39
5434.       001415  4                  TCB.TCBSYNCDCPUCNT := CPUVOTES;                                          !B00,EPN#39
5435.       001415  5                  CALL APPLYACORRECTION ! Have needed history, apply correction !          !B00,EPN#39
5436.       001422  4                  END                                                                      !B00,EPN#39
5437.       001422  3              ELSE                                                                         !B00,EPN#39
5438.       001423  1                  TCB.TCBTIMEAVERAGED := -1;                                               !B00,EPN#39
5439.       001425  3
5440.       001431  3              TCB.AVGCORRECT.PREVAVGTIME := AVERAGETIME;                                   !B00,EPN#39
5441.       001431  4              TCB.AVGCORRECT.PREVRAWTIME := TIMERECVD;                                     !B00,EPN#39
5442.       001441  1              END    ! Apply Average !                                                    !B00,EPN#39
5443.       001446  4          ELSE                                                                             !B00,EPN#39
5444.       001446  3              BEGIN   ! Either RELOAD or PFAIL TSYNC packet - set my clock !               !B00,EPN#39
5445.       001447  4              IF IMSENDER AND NOT FROMLOCKER THEN                                          !B30,EPN#47
5445.1      001447  1                  BEGIN       ! This is my TSYNC packet                                    !B00,EPN#40
5445.12     001453  4                  ! Read the clock and subtract RCLKARECVD to determine                    !B30,EPN#47
5445.13     001453  5                  ! how long it took us to get to this place in the code.                  !B30,EPN#47
5445.14     001453  5                  ! Adjust AVERAGETIME by this amount.                                     !B30,EPN#47
5445.15     001453  5
5445.16     001453  1                  CODE( RCLK );                                                            !B30,EPN#47
5445.17     001453  5                  STACK RCLKARECVD;                                                        !B30,EPN#47
5445.18     001454  5                  CODE (QSUB);                                                             !B30,EPN#47
5445.19     001456  5                  STORE RCLKADELTA;                                                        !B30,EPN#47
5445.2      001457  5                  IF 0 THEN TCB.SYSGENTIME := RCLKADELTA; ! ***** DEBUG ***** !             !B30,EPN#47
5445.21     001461  5                  AVERAGETIME := AVERAGETIME + RCLKADELTA;                                 !B30,EPN#47
5445.22     001470  5
5445.23     001477  5                  IF PIOP.TSYNC.TIMESYNCPFAIL THEN                                         !B30,EPN#47
5445.24     001477  5                      CALL PFAILASYNC   ! Adjust the clock                          !      !B30,EPN#47
5445.25     001503  5                  ELSE                                                                     !B30,EPN#47
5445.26     001503  5                      CALL INITIALASYNC; ! Initialize the clock                     !      !B30,EPN#47
5445.27     001506  5
5445.28     001507  5                  TCB.TCBTIMESYNCD := TIMESYNCD := -1; ! Now we are syncd           !      !B30,EPN#47
5445.4      001507  5                  SENDON := 0;                  ! The packet stops here             !      !B30,EPN#47
5446.113    001515  5                  END;                                                                     !B30,EPN#47
5446.12     001515  5
5446.3      001517  4                  END;   ! NOT TIMESYNCD !                                                 !B30,EPN#47
5448.       001517  4
5449.       001517  3              END    ! COMPUTE AVERAGE                                                    !B00,EPN#39
5450.       001517  3          ELSE                                                                             !B00,EPN#39
5451.       001517  2              BEGIN ! CAN NOT COMPUTE AVERAGE                                              !B00,EPN#39
5452.       001521  2              SENDON := 0;         ! THE PACKET STOPS HERE                                 !B00,EPN#39
5453.       001521  3              END;  ! CAN NOT COMPUTE AVERAGE                                              !B00,EPN#39
5454.       001523  2
5455.       001523  1          END; ! PASS2                                                                     B00,EPN#39
5456.       001523  2                                                                                           B00,EPN#39
```

```
$DATA.GDEVMANG.STIME [32]         T9050 GUARDIAN 90  Time Control - TIMESYNCMSG                    10/01/85  14:00:01

5458.                       IF SENDON THEN                                                            !B00,Grandfather #23
5459.   001523  1             BEGIN                                                                   !B00,Grandfather #23
5460.   001525  1             ! WE SAVE TIMERECVD SO THAT ON THE SECOND PASS, WE CAN COMPUTE          !B00,EPN#39
5461.   001525  2             ! HOW LONG IT TOOK THE PACKET TO CIRCULATE.                             !B00,EPN#39
5462.   001525  2             ! SINCE WE ALSO COUNT THE NUMBER OF TRANSITS, WE CAN COMPUTE THE        !B00,EPN#39
5463.   001525  2             ! THE AVERAGE TIME PER TRANSIT.                                         !B00,EPN#39
5464.   001525  2             ! IF NOT FROMLOCKER THEN TCB.LASTSYNC WAS INITIALIZED IN SENDTIMESYNC.  !B00,EPN#39
5465.   001525  2             ! THIS IS WHY WE MUST ACCOUNT FOR AN EXTRA TRANSIT IF NOT FROMLOCKER.   !B00,EPN#39
5466.   001525  2                                                                                     !B00,EPN#39
5467.   001525  2             IF PASS1 THEN                                                           !B00,EPN#39
5468.   001525  2               BEGIN                                                                 !B00,EPN#39
5469.   001527  2                                                                                     !B00,EPN#39
5470.   001527  3               IF FROMLOCKER THEN                                                    !B00,EPN#39
5471.   001527  3                 BEGIN                                                               !B00,EPN#39
5472.   001531  3                 TCB.LASTSYNC.SENDINGCPU  := ORGCPU;                                 !B00,EPN#39
5473.   001531  4                 TCB.LASTSYNC.GLUPSEQNO   := PIOP.UPSEQ;                             !B00,EPN#39
5474.   001535  4                 TCB.LASTSYNC.RAWTIMESTAMP := TIMERECVD;                             !B00,EPN#39
5475.   001542  4                 END;                                                                !B00,EPN#39
5476.   001547  4                                                                                     !B00,EPN#39
5477.   001547  3             ! TIMESYNCP1CPUCNT IS INCREMENTED ON ENTRY TO TIMESYNCMSG               !B00,EPN#39
5478.   001547  3               PIOP.TSYNC.P1TRANSITSUM := PIOP.TSYNC.P1TRANSITSUM                    !B00,EPN#39
5479.   001547  3                                       + PIOP.TSYNC.TIMESYNCVOTECNT;                 !B00,EPN#39
5480.   001547  3                                                                                     !B00,EPN#39
5481.   001554  3               END   ! PASS1 !                                                       !B00,EPN#39
5482.   001554  2             ELSE                                                                    !B00,EPN#39
5483.   001555  3               BEGIN  ! PASS2 !                                                      !B00,EPN#39
5484.   001555  3               PIOP.TSYNC.TIMESYNCP2CPUCNT := PIOP.TSYNC.TIMESYNCP2CPUCNT + 1;       !B00,EPN#39
5485.   001566  3               END;  ! PASS2 !                                                       !B00,EPN#39
5486.   001566  2                                                                                     !B00,EPN#39
5487.   001566  2                                                                                     !B00,EPN#39
5488.   001566  2             CPUNUM := CPU;                                                          !B00,EPN#39
5489.   001570  2             WHILE NEXTCPU = -1 DO                                                   !B00,EPN#39
5490.   001573  2               BEGIN                                                                 !B00,EPN#39
5491.   001573  3               CPUNUM := (CPUNUM + 1).<12:15>;                                       !B00,EPN#39
5492.   001577  3               IF (PIOP.TSYNC.CPUMASK LAND (%100000 '>>' CPUNUM)) THEN               !B00,EPN#39
5493.   001606  3                 BEGIN                                                               !B00,Grandfather #23
5494.   001606  4                 NEXTCPU := CPUNUM;                                                  !B00,Grandfather #23
5495.   001610  4                 END;                                                                !B00,Grandfather #23
5496.   001610  3               END;                                                                  !B00,Grandfather #23
5497.   001611  3                                                                                     !B00,Grandfather #23
5498.   001611  2             CALL SENDORPHANPIO (NEXTCPU, PIOTIMESYNC, PIOP.DATA);                   !B00,Grandfather #23
5499.   001617  2                                                                                     !B00,Grandfather #23
5500.   001617  2             END;                                                                    !B00,Grandfather #23
5501.   001617  1                                                                                     !B00,Grandfather #23
5502.                                                                                                 
5503.   001617  1           END;                                                                      !B00,Grandfather #23

APPLY^CORRECTION          Subproc
AVERAGETIME               Variable         FIXED (0)    %000327      Direct         L +035
CLOCKBASE                 Variable         FIXED (0)                 SG Pointer     L +013
CORINT                    Literal          INT          %000036
CPUNUM                    Variable         INT                       Direct         L +010
CPUVOTES                  Variable         INT                       Direct         L +012
```

| Name | Type | | Data Type | | Address | |
|---|---|---|---|---|---|---|
| DAMPINGAFACTOR | Literal | | INT | | %000020 | |
| ELAPSEDTIME | Variable | | FIXED (0) | | Direct | L +041 |
| ELAPSEDTIMEP2 | Variable | | FIXED (0) | | Direct | L +045 |
| FROMLOCKER | Variable | | INT | | Direct | L +007 |
| IMSENDER | Variable | | INT | | Direct | L +001 |
| INITIALASYNC | Subproc | | | | %000106 | |
| LONGATRANTIME | Subproc | | | | %000030 | |
| MAXCOR | Literal | | INT | | %000062 | |
| N | Variable | | INT | | Direct | L +011 |
| NEXTCPU | Variable | | INT | | Direct | L +005 |
| NEXTADAMPAIDX | Variable | | STRING | | Direct | P +000 |
| ORGCPU | Variable | | INT | | Direct | L +003 |
| P1AVGTRANTIME | Variable | | FIXED (0) | | Direct | L +052 |
| P1AVGTRANTIMEAINT | Variable | | INT | | Direct | L +055 |
| P1TRANSITS | Variable | | INT | | Direct | L +051 |
| P1TRANTIMESUM | Variable | | FIXED (0) | | Direct | L +056 |
| P2AVGTRANTIME | Variable | | FIXED (0) | | Direct | L +064 |
| P2AVGTRANTIMEAINT | Variable | | INT | | Direct | L +067 |
| P2TRANSITS | Variable | | INT | | Direct | L +062 |
| P2TRANSITSUM | Variable | | INT | | Direct | L +063 |
| P2TRANTIMESUM | Variable | | FIXED (0) | | Direct | L +070 |
| PASS1 | Define | | | | (NOT PASS2) | |
| PASS2 | Variable | | INT | | Direct | L +006 |
| PERMADAMPAMUL | Variable | | STRING | | Direct | P +000 |
| PFAILASYNC | Subproc | | | | %000207 | |
| PIOP | Variable,50 | | STRUCT-I | | Indirect | |
| RATELIMIT | Literal | | INT | | %013560 | |
| RCLKADELTA | Variable | | FIXED (0) | | Direct | L -003 |
| RCLKARECVD | Variable | | FIXED (0) | | Direct | L +025 |
| SENDON | Variable | | INT | | Direct | L +021 |
| TCB | Variable,264 | | STRUCT-I | | SG Pointer | L +004 |
| TEMPADAMPAMUL | Variable | | STRING | | Direct | P +000 |
| TIMERECVD | Variable | | FIXED (0) | | Direct | L +015 |
| TIMERECVDAC | Variable | | FIXED (0) | | Direct | L +031 |
| TIMESYNCD | Variable | | INT | | Direct | L +002 |
| TRANTIMEDEVIATION | Literal | | INT | | %000144 | |
| VOTERSAAVGADJUSTMENTS | Variable | | FIXED (0) | | Direct | L +074 |
| VOTINGADAMPIDX | Literal | | INT | | %000002 | |

```
00000  010017 007015 006013 005011 004010 004010 004010 004010 004010 004010
00020  000402 001404 002406 003410 004412 005414 006416 007417 014406 000002
00040  040742 102010 172414 000446 040412 045002 000215 013013 025002 040742
00060  173414 000351 010420 010742 040740 040740 000215 016013 102003 173414
00100  100777 002777 025002 100000 000234 000215 016013 102003 040742 000446
00120  070435 000234 070415 000241 025002 070474 000445 000234 102024 173414
00140  170414 000357 100001 100007 130006 000241 170413 000445 000241 101030
00160  000445 000241 103020 173414 000446 000357 103020 172414 000025 000200
00200  025001 000006 000000 000000 000000 000000 000000 000234 000200 000005
00210  070435 070431 170050 000351 000234 070200 070743 070430 026057 070220
```

$DATA.GDEVMANG.SMSGSYS [40]    TNS/II GUARDIAN Message System -- SENDTIMESYNC    16JAN86  11:49:23

```
7902.  000000  0                                                                                              B00,Grandfather #48
7903.  000000  0   ! This proc is used to synchronize time in a system by averaging                           B00,Grandfather #48
7904.  000000  0   ! the clock rates in a system. If called by the monitor in the                             B00,Grandfather #48
7905.  000000  0   ! LOCKERCPU, all CPUs will compute a new time average and adjust                           B00,Grandfather #48
7906.  000000  0   ! their effective clock rates accordingly. May also be called by                           B00,Grandfather #48
7907.  000000  0   ! a newly reloaded CPU to determine the average number of ticks                            B00,Grandfather #48
7908.  000000  0   ! since loading.                                                                           B00,Grandfather #48
7909.  000000  0   !                                                                                          B00,Grandfather #48
7910.  000000  0   ! The PIO packet will make two loops through the system. Each                              B00,Grandfather #48
7911.  000000  0   ! CPU will contribute to the time average and pass the packet on                           B00,Grandfather #48
7912.  000000  0   ! to the right using the CPU mask contained in the packet. A                               B00,Grandfather #48
7913.  000000  0   ! newly reloaded CPU will abstain from contributing until it has                           B00,Grandfather #48
7914.  000000  0   ! determined the time accurately. On the second pass each CPU                              B00,Grandfather #48
7915.  000000  0   ! will determine the average number of "RAW" ticks since SYSTEM                            B00,Grandfather #48
7916.  000000  0   ! COLD LOAD and adjust the clock rate accordingly.                                         B00,Grandfather #48
7917.  000000  0   !                                                                                          B00,Grandfather #48
7918.  000000  0   PROC!prv! SENDTIMESYNC( LOCKER, PFAIL ) PRIV, VARIABLE;                                    B00,Grandfather #48
7918.1 000000  1       INT   LOCKER,    !  0 = INITIAL,    1 = LOCKER                                        !B10,EPN#84
7918.2 000000  1             PFAIL;                                                                          !B10,EPN#84
7918.3 000000  1                                                                                             !B10,EPN#84
7921.  000000  1   BEGIN                                                                                     !B10,EPN#84
7922.  000000  1                                                                                             !B00,Grandfather #48
7923.  000000  1       INT   MUTEXMASK;                                                                      !B00,Grandfather #48
7924.  000000  1                                                                                             !B00,Grandfather #48
7925.  000000  1       INT   .SG TCB( TCB^TEMPLATE ) := SG0[ TIMEINFO^SGADDR ];                              !B00,Grandfather #48
7926.  000000  1                                                                                             !B00,Grandfather #48
7927.  000000  1       STRUCT  .TSYNC( TSYNC^TEMPLATE );                                                     !B00,Grandfather #48
7928.  000000  1       INT     .TSYNCAWORD = TSYNC;                                                          !B00,Grandfather #48
7929.  000000  1                                                                                             !B00,Grandfather #48
7930.  000000  1       INT     CPUUPMASK  := 0;                                                              !B00,Grandfather #48
7931.  000000  1       INT     CPUUPCOUNT := 0;                                                              !B00,Grandfather #48
7932.  000000  1                                                                                             !B00,Grandfather #48
7933.  000000  1       INT     NEXTUPCPUNUM := -1;                                                           !B00,Grandfather #48
7934.  000000  1                                                                                             !B00,Grandfather #48
7935.  000000  1                                                                                             !B00,Grandfather #48
7936.  000000  1   ! Compute CPUMASK, CPUCOUNT and NEXTCPU from POLLLIST info !                              !B00,Grandfather #48
7937.  000000  1   USE X;                                                                                    !B00,Grandfather #48
7938.  000010  1   FOR X := 0 TO 15 DO                                                                       !B00,Grandfather #48
7939.  000013  1       BEGIN                                                                                 !B00,Grandfather #48
7940.  000013  1       USE Y;                                                                                !B00,Grandfather #48
7941.  000013  2       Y := (CPU + X + 1).<12:15>;                                                           !B00,Grandfather #48
7942.  000020  2       IF POLLLIST[Y].<15> THEN                                                              !B00,Grandfather #48
7943.  000023  2          BEGIN                                                                              !B00,Grandfather #48
7944.  000023  3          CPUUPCOUNT := CPUUPCOUNT + 1;                                                      !B00,Grandfather #48
7945.  000025  3          CPUUPMASK  := CPUUPMASK LOR (%100000 '>>' Y);                                      !B00,Grandfather #48
7946.  000033  3          IF NEXTUPCPUNUM = -1 THEN NEXTUPCPUNUM := Y;                                       !B00,Grandfather #48
7947.  000040  3          END;                                                                               !B00,Grandfather #48
7948.  000040  2       DROP Y;                                                                               !B00,Grandfather #48
7949.  000040  2       END;                                                                                  !B00,Grandfather #48
7950.  000041  1   DROP X;                                                                                   !B00,Grandfather #48
7951.  000041  1                                                                                             !B00,Grandfather #48
7952.  000041  1   ! We start filling in the PIO DATA info !                                                 !B00,Grandfather #48
```

```
7953.   000041 1          TSYNCAWORD := 0; TSYNCAWORD[1] ':=' TSYNC[0] FOR ($LEN(TSYNC)-1)/2;   !B00,Grandfather #48
7954.   000050 1          TSYNC.TIMESYNCORGCPU := CPU;                                            !B00,Grandfather #48
7955.2  000055 1          TSYNC.CPUMASK := CPUPMASK;                                              !B00,EPN#81
7955.3  000060 1          TSYNC.TIMESYNCALLCPUS := LOCKER;                                        !B00,EPN#81
7955.4  000065 1          IF $PARAM( PFAIL ) THEN                                                 !B10,EPN#81
7956.   000070 1            TSYNC.TIMESYNCPFAIL := PFAIL;                                         !B10,EPN#84
7958.   000075 1  !        We must change the CPU number first because it is checked first  !    !B00,Grandfather #48
7959.   000075 1  !        in the proc TIMESYNCMSG (see STIME). This avoids any MUTEXes.     !    !B00,Grandfather #48
7960.   000075 1          TCB.LASTSYNC.SENDINGCPU := CPU;                                         !B00,Grandfather #48
7961.   000101 1          TCB.LASTSYNC.GLUPSEQNO := GLUPSEQ;                                      !B00,Grandfather #48
7962.   000106 1                                                                                  !B00,Grandfather #48
7963.   000106 1  !        Compute sending time so we can measure transit time.              !    !B00,Grandfather #48
7964.   000106 1  !        (This is only used for the initial TIME SYNC packet)              !    !B00,Grandfather #48
7965.1  000111 1          MUTEXON (100 << 8 + 40);                                                !B00,EPN#77
7965.2  000112 1          CODE (RCLK);                                                            !B00,EPN#77
7965.3  000116 1          IF TCB.TCBTIMESYNCD THEN                                                !B00,EPN#77
7965.4  000116 2            BEGIN                                                                 !B00,EPN#77
7965.5  000116 2              STACK TCB.TOTALADJUSTMENTS;                                         !B00,EPN#77
7965.6  000121 2              CODE (QSUB);                                                        !B00,EPN#77
7965.7  000122 2            END;                                                                  !B00,EPN#77
7968.   000122 1          MUTEXOFF;                                                               !B00,Grandfather #48
7969.   000123 1          STORE TCB.LASTSYNC.RAWTIMESTAMP;                                        !B00,JDK#78
7969.1  000126 1                                                                                  !B00,JDK#78
7971.   000126 1  !        Finally, send the PIO packet around the system                    !    !B00,Grandfather #48
7972.   000126 1          CALL SENDORPHANPIO( NEXTUPCPUNUM, PIOTIMESYNC, TSYNC);                  !B00,Grandfather #48
7973.   000133 1                                                                                  !B00,Grandfather #48
7974.   000133 1        END;
```

```
CPUUPCOUNT                  Variable         INT                     Direct         L+005
CPUPMASK                    Variable         INT                     Direct         L+004
LOCKER                      Variable         INT                     Direct         L-005
MUTEXMASK                   Variable         INT                     Direct         L+001
NEXTUPCPUNUM                Variable         INT                     Direct         L+006
PFAIL                       Variable         INT                     Direct         L-004
TCB                         Variable,264     STRUCT-I                SG Pointer     L+002
TSYNC                       Variable,30      STRUCT                  Indirect       L+003
TSYNCAWORD                  Variable         INT                     Indirect       L+003
```

```
00000  002001 103156 043600 070407 000002 100777 024744 002014
00020  152615 006001 014415 100001 074405 040404 005200 000136
00040  013752 100000 144403 103001 170403 000013 026007
00060  040705 100001 101006 171403 000367 040703 006001 014405
00100  000351 102023 142677 101063 171402 000351 005144 004050
00120  000445 000241 000041 103064 173402 000446 040406 100025

00000                                   00010 103777 100017 010425 040600 000147 104001 006017 000116
00020                                   00030 030100 030100 044404 040406 001777 015002 000136 044406
00040                                   00050 040600 100001 130014 170403 000367 040404 102001 146403
00060                                   00070 040703 040700 130017 171403 000367 040600 103062 173402
00100                                   00110 000040 000000 170402 000350 040404 014404 103020 173402
00120                                   00130 170403 024722 027000 125006 006002
```

```
000000  7 ADDS     +001                     7 LDXI    SG+000,7      0.LOAD   SG+000,7       3 ZERD                       4 LDI      -001
000006  7 PUSH     744                      7 ADDS    -001,7        7 LDXI   +017           0 BUN     +025               1 LOAD     SG+000
000014  1 ADRA     7                        1 ADDI    +017          1 ANRI   +017                   SG+015,I,6           1 ANRI     +001
000022  0 BAZ      +015                     1 LDI     +001          0 ADM    L+005          1 LDB    +200                3 LDRA     6
000030  2 LRS      00                       1 LOR     L+005         0 STOR   L+004          2 LDLI   -001                0 BNEQ     +002
000036  1 LDRA     6                        0 STOR   L+004          7 BOX    -026.7         0 CMPI   L+003.I             7 LDXI     +001.7
000044  1 LADR     L+003.I.7                1 LADR   L+003.I        2 LDI    +013           7 STOR   SG+000              1 LDI      +017
                                                                                            0 LOAD   007
                                                                                            7 MOVW
```

```
000052  1 DLLS           14      2 LADR  L+003,I    7 DFG            +006,5   0 LOAD   L+004       0 LDXI   +001,6    7 STOR   L+003,I,6
000060  0 LOAD         L-005     1 LDI   +001       1 LDXI  L-004             2 LADR   L+003,I,5   7 DFG               0 LOAD   L-003
000066  0 ANRI         +001      7 BAZ   +005       0 LOAD  +062,7            1 LDI    +001        1 DLLS   17        2 LADR   L+003,I,5
000074  7 DFG                    0 LOAD  SG+000     0 LDXI  L+002,I,5         1 LADR   L+002,I,7   7 SWAS              7 LDXI   +023,6
000102  0 LOAD         SG+077,I,6 0 LDXI +063,5     1 LADR  L+002,I           7 SWAS               0 LDLI   +144       0 ORRI   050
000110  7 MXON                   3 RCLK             4 LADR                    4 LWAS               4 ANRI   +002       3 BAZ    +004
000116  3 LDXI         +020,7    4 LADR  L+002,I,7  7 LQAS                    3 QSUB               3 MXFF              3 LDXI   +064,7

$DATA.GDEVMANG.SMONTOR [63]          T9050 GUARDIAN 90      System Monitor - MAIN PROCEDURE            20JAN86  18:02:35

30001.  015712 1   ! After a cpu load, the Monitor starts execution at this point.
30002.  015712 1   ! The Memory Manager, the Discprocess(es) and the Operator will
30003.  015712 1   ! already have done their initialization.
30004.  015712 1
30008.  016021 1     STACK  -1;
30009.  016022 1     CODE( SSW  );
30010.  016023 1     STACK  69;
30011.  016024 1     CODE( TOPT );
30012.  016025 1     IF < THEN
30013.  016025 1       SYSTEM^FREEZE( MON^NOGUARD );  ! didn't even buy Guardian
30014.  016032 1   ! Check for misuse of EXT cpu board                             !B10,EPN#156
30015.  016032 1   ! Tandem prohibits the use of EXT processor boards outside of EXT systems  !B10,EPN#156
30016.  016032 1                                                                  !B10,EPN#156
30017.  016032 1   ! count how many cpus are up                                    !B10,EPN#156
30018.  016032 1     CPUUPCOUNT := 0;                                              !B10,EPN#156
30019.  016035 1     USE X;                                                        !B10,EPN#156
30020.  016035 1     FOR X := 0 TO 15 DO                                           !B10,EPN#156
30021.  016040 1       IF POLLLIST[X].<15> THEN                                    !B10,EPN#156
30022.  016043 1         CPUUPCOUNT := CPUUPCOUNT + 1;                             !B10,EPN#156
30023.  016052 1                                                                   !B10,EPN#156
30024.  016052 1     DROP X;                                                       !B10,EPN#156
30025.  016052 1                                                                   !B10,EPN#156
```

```
30026.  016052 1 1   ! The reloader cpu has initialized two flag bits in the coldload pointer:    B10,EPN#156
30027.  016052 1 1   !  RELOADER^IS^UNIV - reloader has a universal prom                           B10,EPN#156
30028.  016052 1 1   !  RELOADER^IS^EXT  - reloader has the EXT option prom bit set                B10,EPN#156
30029.  016052 1 1   !                                                                             B10,EPN#156
30030.  016052 1 1   ! If either the reloader or the reloadee has a universal prom, it implies     B10,EPN#156
30031.  016052 1 1   ! that this is a Tandem in-house system, and no further checking is done.     B10,EPN#156
30032.  016052 1 1   ! Otherwise, if, between the reloader and reloadee, one has the EXT option    B10,EPN#156
30033.  016052 1 1   ! bit set and one does not, or if there are more than 4 EXT cpus, then        B10,EPN#156
30034.  016052 1 1   ! we freeze (because Tandem does not sell these configurations).              B10,EPN#156
30035.  016052 1 1                                                                                !B10,EPN#156
30036.  016052 1 1   IF CPUUPCOUNT >^1 AND NOT COLDLOAD.RELOADER^IS^UNIV THEN                     !B10,EPN#156
30037.  016052 1 1   BEGIN                                                                        !B10,EPN#156
30038.  016062 1 2     ! if this is not the only cpu up                                            B10,EPN#156
30039.  016062 1 2     ! and the reloader does not have universal prom then perform checks         B10,EPN#156
30040.  016062 1 2                                                                                 B10,EPN#156
30041.  016062 1 2     IF NOT OPTION^PROM( -1 ) THEN ! my cpu does not have universal prom         B10,EPN#156
30042.  016062 1 2     BEGIN                                                                       B10,EPN#156
30043.  016066 1 3       I^AM^EXT := OPTION^PROM( 232 ); ! check to see if I have EXT bit set      B10,EPN#156
30044.  016066 1 3       IF (I^AM^EXT <> COLDLOAD.RELOADER^IS^EXT) OR   ! mixture of EXT/non-EXT   B10,EPN#156
30045.  016075 1 3          (I^AM^EXT AND CPUUPCOUNT > 4) THEN          ! or more than 4 EXTs      B10,EPN#156
30046.  016114 1 3         SYSTEM^FREEZE( MON^EXTTHEFT );               ! misuse of EXT cpu        B10,EPN#156
30047.  016121 1 3                                                                                !B10,EPN#156
30048.  016121 1 3     END;                       ! I do not have universal prom                   B10,EPN#156
30049.  016121 1 2   END;                         ! Reloader does not have universal prom         !B10,EPN#156
30050.  016121 1 1                                                                                !B10,EPN#156
30051.  016121 1 1   IF LOCKMEMORY( STACKL, $UDBL(MONSTACKSIZE<<1) ) < 0 OR                        !A04,RWC #28
30052.  016121 1 1      LOCKMEMORY( SHP, 2048D ) < 0 THEN                                          !A04,RWC #28
30053.  016152 1 1     SYSTEM^FREEZE( MON^NOMEM ); ! Can't lock stack or share table                B30,MTR#168
30054.  016157 1 1   SHT := SHARE^ADDR;                                                            !B30,MTR#168
30055.  016162 1 1                                                                                !B00,RWC#113
30055.2 016162 1 1   CALL OPENOSIMAGEFILE( HIGHESTSYSLIBSEG, OSIFNUM );                             B00,RKS #85
30058.  016166 1 1   ! get data segment for newprocess and stop processes                          B00,RKS #85
30059.  016166 1 1                                  ! get 128k bytes                               B00,RKS #85
30060.  016166 1 1   LAUNCH^SEGNUM := GETSEGMENT(%377777D, SPTRESSEG);                             !B00,RKS #85
```

We claim:

1. In a multiprocessor system of the type including a plurality of individual processor units coupled to one another by an interprocessor bus for communication therebetween, each processor unit including means for maintaining a processor clock capable of providing a value indicative of real time, a method of synchronizing the processor clock, comprising:

forming a time synchronization message in a first one of the processor units;

the first processor unit communicating the time synchronization message on the interprocessor bus sequentially to designated ones of the processor units, the time synchronization message including a separate first bit field identifying the first processor unit as the originator of the time synchronization message and the processor units designated to receive the time synchronization message, a second bit field containing an indication of processor clock time, and a third bit field representative of the number of processor-to-processor transits taken by the time synchronization message;

each of the designated processor units in sequence:
receiving the time synchronization message,
replacing the content of the second bit field with a sum of the original content of the third bit field and a value indicative of the receiving processor unit's processor clock, and
retransmitting the time synchronization message on the processor bus, at the first one of the processor units, adjusting the processor clock according to the content of the time synchronization message.

2. The method of claim 1, including the steps of: recommunicating the time synchronization message on the interprocessor bus sequentially to the designated ones of the processor units;

each of the designated processor units:
receiving the recommunicated time synchronization;
adjusting the processor clock according to the content of the time synchronization message, and
retransmitting the time synchronization message on the processor bus.

3. The method of claim 1, wherein the adjusting step includes the step of computing an average processor clock value from the content of the second and third bit fields.

4. The method of claim 3, including the step of computing an average transit time representative of the time for communicating the time synchronization message sequentially to the designated ones of the processor units.

5. In a multiprocessor system of the type including a plurality of individual processor units coupled to one another by an interprocessor bus for communication therebetween, each processor unit including means for maintaining a processor clock capable of providing a value indicative of real time, a method of synchronizing the processor clock, comprising:

forming a time synchronization message by one of the processor units;

circulating the time synchronization message among the processor units in a sequential order to obtain a time value indicative of the sum of the processor clock values of the processor units at a particular time;

communicating the time value to each of the processor units together with a transit time value indicative of the real time taken by the time synchronization message in communication to each of the other processor units;

at each processor unit, receiving the time value and the transit time value to calculate therefrom an error value indicative of a difference between the processor clock of said each processor unit and the time value; and updating, at each processor unit, the processor clock by the error value.

6. In a multiprocessor system of the type formed from a plurality of separate processor units intercoupled for communication therebetween by a bus means, each of the processor units maintaining clock means for providing a real time value, apparatus for synchronizing the clock means of each of the processor units to one another, the apparatus comprising:

first circuit means included in at least one of the processor units for forming a time synchronization message having a first bit field defining a time value and a second bit field defining a transit value, the one processor unit being operable to transmit the time synchronization message on the bus to other of the processor units in a predetermined sequence in which the one processor unit receives the time synchronization message last;

second circuit means in each of the processor units for replacing the time value bit field with a sum of the immediately preceding time value and a value provided by the clock means and for storing locally a present time value indicative of the time of receipt of the time synchronization message during a first pass transmission of the time synchronization message;

third circuit means in the one processor unit for computing a transit time value representative of the time to communicate the time synchronization message to the designated processor units during the first pass transmission and setting a transit value bit field of the time synchronization with the transit time value;

each of the processor units having fourth circuit means for computing an error value from the content of the time synchronization message and the clock means, and fifth circuit means for adjusting the clock means with the error value.

7. Apparatus operable to maintain synchronization of a number of individual system clock means for providing a time value indicative of real time, each clock means forming a part of a corresponding one of a number of processor units, including an originator processor unit, of a multiprocessor system, the apparatus compising:

means for obtaining in the originator processor units a clock value representative of the time values of the system clock means of the processor units;

means for communicating a time synchronization message containing the clock value to the processor units together with a transit value indicative of the time of communication of the time synchronization message; and means in each of the processor units for computing an average system clock value representative of the average of the system clock means of the processor units from the clock value and the transit value, and means for adjusting the clock means of the processor unit in response to an error value determined from the average and the clock means.

8. The apparatus of claim 4, wherein the communicating means includes:
a bus means operably interconnecting the processor units to one another for communication therebetween;
means in each of the processor units for receiving the time synchronization message to replace the content of the first bit field with a sum indicative of the content of the first bit field when received by the processor unit and the time value of the clock means of the processor unit, and for recommunicating the time synchronization message to the other of the processor units and lastly to the originator processor unit according to a designated sequence defined by a bit field contained in the time synchronization message.

9. The apparatus of claim 8, wherein the communication means includes means for communicating the time synchronization message from the originator processor unit to the certain of the other processor units in a sequential order for return to the originator processor unit.

10. Apparatus to maintain synchronization of a system clock located in each of a number of processor units of a multiprocessor system, the apparatus comprising:
bus means interconnecting the processor units for providing communication therebetween;
an originator one of the processor units including means for forming a time synchronization message for sequential communication to other of the processor units, the time synchronization message including bit fields defining:
a. a system clock sum value,
b. a count value indicative of the number of processor units;
means in each of the processor units for receiving a first pass transmission of the time synchronization message and for updating the time synchronization message with a value indicative of a sum comprising the content of the system clock sum value bit field and the value processor system clock; and
means in the originator one of the processor units for retransmitting the time synchronization message in a second pass transmission, and
means in each of the processor units for receiving the second pass transmission of the time synchronization message and for calculating a clock error value from the system clock sum value and for updating the system clock of said processor.

* * * * *